United States Patent
Oda et al.

(10) Patent No.: US 10,374,703 B2
(45) Date of Patent: Aug. 6, 2019

(54) TRANSMISSION DEVICE AND SIGNAL MONITORING METHOD

(71) Applicant: FUJITSU LIMITED, Kawasaki-shi, Kanagawa (JP)

(72) Inventors: Shoichiro Oda, Fuchu (JP); Takeshi Hoshida, Kawasaki (JP); Hisao Nakashima, Kawasaki (JP); Yi Ge, Bunkyo (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/110,451

(22) Filed: Aug. 23, 2018

(65) Prior Publication Data
US 2019/0081701 A1 Mar. 14, 2019

(30) Foreign Application Priority Data
Sep. 14, 2017 (JP) ................................ 2017-177145

(51) Int. Cl.
| | |
|---|---|
| *H04B 10/079* | (2013.01) |
| *H04B 10/67* | (2013.01) |
| *H04J 14/02* | (2006.01) |
| *H04Q 11/00* | (2006.01) |
| *H04L 1/20* | (2006.01) |

(52) U.S. Cl.
CPC ......... *H04B 10/07953* (2013.01); *H04L 1/20* (2013.01)

(58) Field of Classification Search
CPC ........ H04B 10/07953; H04B 10/07957; H04B 10/675; H04L 1/20; H04J 14/0257; H04J 14/0212; H04Q 2011/0009; H04Q 2011/0086

USPC .......................................................... 398/25
See application file for complete search history.

(56) References Cited

U.S. PATENT DOCUMENTS

| | | | |
|---|---|---|---|
| 9,485,554 B1 * | 11/2016 | Kim ..................... | H04J 14/0221 |
| 2011/0188851 A1 | 8/2011 | Oda et al. | |
| 2011/0293270 A1 * | 12/2011 | Takeuchi ......... | H04B 10/25133 398/45 |
| 2013/0209093 A1 | 8/2013 | Tanimura et al. | |

(Continued)

FOREIGN PATENT DOCUMENTS

| | | |
|---|---|---|
| JP | 2011-160162 | 8/2011 |
| JP | 2013-165407 | 8/2013 |

(Continued)

OTHER PUBLICATIONS

Wellbrock et al., "In-Service Chromatic Dispersion and Pass-Band Shape Measurements for Light Path with Modulated ASE Source", Conference on Optical Fiber Communication (OFC/NFOEC), collocated National Fiber Optic Engineers Conference, Mar. 2010.

(Continued)

Primary Examiner — Dalzid E Singh
(74) Attorney, Agent, or Firm — Staas & Halsey LLP

(57) ABSTRACT

A transmission device includes: a receiving unit that receives an optical signal; an acquiring unit that acquires spectrum information from the optical signal, the spectrum information relating to a spectrum of the optical signal; and a narrowing calculating unit that calculates an index value for narrowing of a band of the optical signal by calculating a sampling timing error in accordance with the spectrum information, the sampling timing error being an error when a clock signal is extracted from the optical signal.

14 Claims, 18 Drawing Sheets

(56) References Cited

U.S. PATENT DOCUMENTS

| | | | |
|---|---|---|---|
| 2013/0236169 A1* | 9/2013 | Gaudette | H04B 10/0793 398/25 |
| 2015/0139644 A1* | 5/2015 | Kato | H04J 14/021 398/52 |
| 2015/0280852 A1* | 10/2015 | Nakagawa | H04J 14/0212 398/34 |
| 2016/0192042 A1* | 6/2016 | Mitchell | H04Q 11/0005 398/48 |
| 2016/0241936 A1* | 8/2016 | Nagamine | H04B 10/564 |
| 2016/0373187 A1 | 12/2016 | Oda et al. | |
| 2017/0019204 A1* | 1/2017 | Yilmaz | H04J 14/0212 |
| 2017/0047993 A1 | 2/2017 | Huang et al. | |
| 2017/0134114 A1* | 5/2017 | Boertjes | H04J 14/0257 |
| 2018/0287698 A1* | 10/2018 | Oda | H04B 10/07953 |
| 2018/0295429 A1* | 10/2018 | Swinkels | H04Q 11/0062 |
| 2019/0037289 A1* | 1/2019 | Takeshita | H04B 10/27 |
| 2019/0064437 A1* | 2/2019 | Matsuyama | G02F 1/31 |

FOREIGN PATENT DOCUMENTS

| | | |
|---|---|---|
| JP | 2016-025518 | 2/2016 |
| JP | 2017-011506 | 1/2017 |
| JP | 2017-038228 | 2/2017 |

OTHER PUBLICATIONS

Gardner, "A BPSK/QPSK Timing-Error Detector for Sampled Receivers", IEEE Transaction on Communications, vol. COM-34, No. 5, pp. 423-429, May 1986.

Yan et al., "Digital Clock Recovery Algorithm for Nyquist Signal", Optical Fiber Communication Conference (OFC/NFOEC) Technical Digest, Mar. 2013.

Poggiolini, "The GN Model of Non-Linear Propagation in Uncompensated Coherent Optical Systems", Journal of Lightwave Technology, vol. 30, No. 24, pp. 3857-3879, Dec. 15, 2012.

* cited by examiner

TRANSMISSION DEVICE AND SIGNAL MONITORING METHOD

CROSS-REFERENCE TO RELATED APPLICATION

This application is based upon and claims the benefit of priority of the prior Japanese Patent Application No. 2017-177145 filed on Sep. 14, 2017, the entire contents of which are incorporated herein by reference.

FIELD

A certain aspect of the embodiments described herein relates to a transmission device and a signal monitoring method.

BACKGROUND

An optical add/drop device such as a reconfigurable optical add-drop multiplexer (ROADM) is equipped with a wavelength selective switch (WSS) that adds/drops an optical signal of any desired wavelength to/from a multiple-wavelength optical signal as disclosed in Japanese Patent Application Publication Nos. 2011-160162 and 2017-11506. As the filter passbands corresponding to the respective selectable wavelengths are set in the wavelength selective switch, the passband of an optical signal becomes narrower (PBN: PassBand Narrowing) due to accumulation of filter passbands every time passing through the optical add/drop device.

In a backbone network that performs long-distance transmission, for example, the number of signals to be subjected to adding/dropping is small, and accordingly, the influence of passband narrowing is small. In a metropolitan area network that performs short-distance transmission in a metropolitan area or the like, on the other hand, the number of signals to be subjected to adding/dropping is large, and therefore, the influence of passband narrowing is large.

SUMMARY

According to an aspect of the embodiments, there is provided a transmission device including: a receiving unit that receives an optical signal; an acquiring unit that acquires spectrum information from the optical signal, the spectrum information relating to a spectrum of the optical signal; and a narrowing calculating unit that calculates an index value for narrowing of a band of the optical signal by calculating a sampling timing error in accordance with the spectrum information, the sampling timing error being an error when a clock signal is extracted from the optical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An optical signal contains an error correction code such as a forward error correction (FEC) code. In a case where the influence of passband narrowing is small, the use of an error correction code with a large overhead amount increases the optical signal transmission distance.

However, the spectrum bandwidth of an optical signal becomes greater as the overhead amount of the error correction code becomes larger. Therefore, in a case where the influence of passband narrowing is large, the clock recovery of the optical signal results in a failure due to cutoff of the edges of the spectrum, and a demodulation process for the optical signal becomes impossible in some cases. Because of this, if an error correction code with a large overhead amount is used in a case where the influence of passband narrowing is large, the transmission distance might become shorter.

On the other hand, if the influence of passband narrowing is measured, for example, an appropriate error correction code can be selected in accordance with the measurement result. However, in the measurement, it is necessary to perform complicated calculations from a large number of parameters relating to the network operation status, such as the number of signals to be subjected to adding/dropping in the network.

Figure 1:
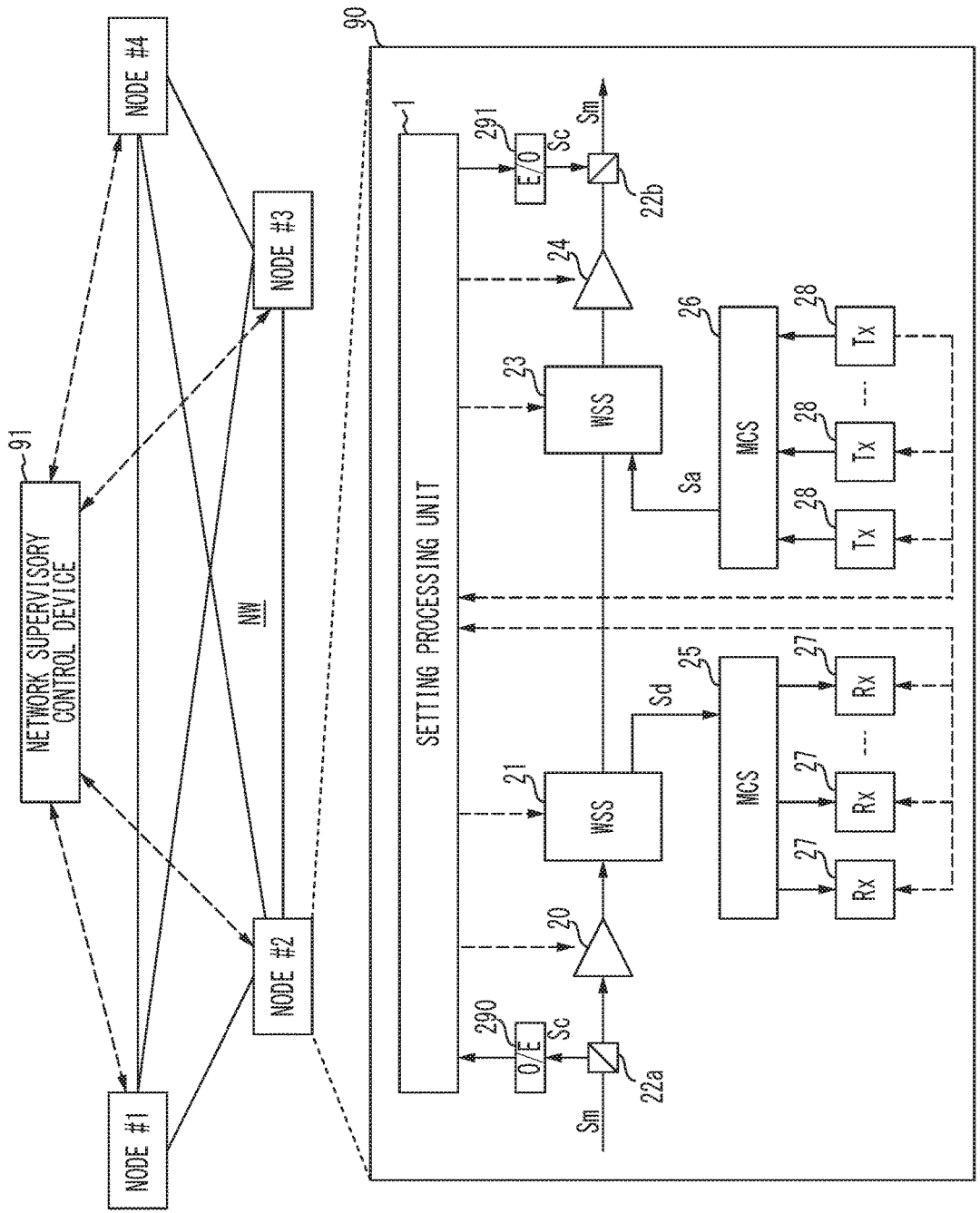
FIG. 1 is a configuration diagram showing an example of a network and a ROADM.

FIG. 1 is a configuration diagram showing an example of a network and a ROADM. The network includes a network monitoring control device 91 and nodes #1 through #4. The nodes #1 through #4 are connected to one another via an optical fiber serving as a transmission path, to form a mesh network. It should be noted that the number of nodes in the network is not limited to any particular number.

The network monitoring control device 91 performs monitoring control on the respective nodes #1 through #4 by communicating with the respective nodes #1 through #4 via a local area network (LAN) designed for monitoring control. The network monitoring control device 91 is an operation system (OpS), for example.

The nodes #1 through #4 each include a ROADM 90 as an example of a transmission device. Although FIG. 1 shows the configuration of the ROADM 90 of the node #2 as an example, the other nodes #1, #3, and #4 have the same configuration as the node #2.

The ROADM 90 includes a setting processing unit 1, optical amplifiers 20 and 24, wavelength selective switches (WSSs) 21 and 23, wavelength division multiplexing (WDM) couplers 22a and 22b, and multicast switches (MCSs) 25 and 26. The ROADM 90 further includes receivers 27, transmitters 28, an optical-electrical converting unit (O/E) 290, and an electrical-optical converting unit (E/O) 291. It should be noted that FIG. 1 shows a configuration for outputting a multiple-wavelength optical signal Sm input from the path on the side of the node #1 to the path on the side of the node #3, for example.

The multiple-wavelength optical signal Sm input to the ROADM 90 is input to the WDM coupler 22a. The WDM coupler 22a separates an optical signal Sc of the wavelength of an optical supervisory channel from the multiple-wavelength optical signal Sm, and outputs the optical signal Sc to the optical-electrical converting unit 290. The optical-electrical converting unit 290 is formed with a circuit including a photodiode, for example. The optical-electrical converting unit 290 converts the optical signal Sc into an electrical control signal, and outputs the electrical control signal to the setting processing unit 1. It should be noted that the optical signal Sc functions as a control signal for the optical supervisory channels (OSCs) among the nodes #1 through #4. The multiple-wavelength optical signal Sm from which the optical signal Sc has been separated is input to the optical amplifier 20.

The optical amplifier 20 includes a light source such as a laser diode, and an erbium-doped fiber or the like, for example. The optical amplifier 20 amplifies the multiple-wavelength optical signal Sm, and outputs the multiple-wavelength optical signal Sm to the wavelength selective switch 21. It should be noted that the amplification factor of the optical amplifier 20 is set by the setting processing unit 1, for example.

From the multiple-wavelength optical signal Sm, the wavelength selective switch 21 selects the optical signal Sd of the wavelength to be subjected to dropping, and outputs the optical signal Sd to the multicast switch 25.

The multicast switch 25 includes optical splitters and optical switches, and outputs the optical signal Sd input from an input port through a desired output port. The receiver 27 is connected to each of the output ports of the multicast switch 25.

The receiver 27 receives the optical signal Sd output from an output port of the multicast switch 25. The configuration of the receiver 27 will be described later.

The wavelength selective switch 21 guides the multiple-wavelength optical signal Sm including optical signals of other wavelengths to the wavelength selective switch 23. It should be noted that the wavelength of the optical signal Sd to be selected by the wavelength selective switch 21 is set by the setting processing unit 1, for example.

The wavelength selective switch 23 generates a new multiple-wavelength optical signal Sm by selecting the multiple-wavelength optical and the optical signal Sa of the wavelength to be subjected to adding, and outputs the new multiple-wavelength optical signal Sm to the optical amplifier 24. It should be noted that the wavelength of the optical signal Sa to be selected by the wavelength selective switch 23 is set by the setting processing unit 1, for example.

The optical signal Sa is input from the multicast switch 26 to the wavelength selective switch 23. A transmitter 28 is connected to each of the input ports of the multicast switch 26. Each transmitter 28 outputs an optical signal to the multicast switch 26. The configuration of each transmitter 28 will be described later.

The multicast switch 26 includes an optical coupler and optical switches. The multicast switch 26 generates the optical signal Sa by multiplexing optical signals input from the respective input ports, and outputs the optical signal Sa to the wavelength selective switch 23 via an output port. The wavelength selective switch 23 outputs the new multiple-wavelength optical signal Sm to the optical amplifier 24.

The optical amplifier 24 includes a light source such as a laser diode, and an erbium-doped fiber or the like, for example. The optical amplifier 24 amplifies the multiple-wavelength optical signal Sm input to the wavelength selective switch 23. It should be noted that the amplification factor of the optical amplifier 24 is set by the setting processing unit 1, for example. The multiple-wavelength optical signal Sm output from the optical amplifier 24 is input to the WDM coupler 22b.

The optical signal Sc is input from the electrical-optical converting unit 291 to the WDM coupler 22b. The electrical-optical converting unit 291 includes a laser diode, for example. The electrical-optical converting unit 291 converts the electrical control signal input from the setting processing unit 1 into the optical signal Sc, and outputs the optical signal Sc to the WDM coupler 22b.

The WDM coupler 22b combines the multiple-wavelength optical signal Sm with the optical signal Sc. The multiple-wavelength optical signal Sm combined with the optical signal Sc is output to an adjacent node.

The setting processing unit 1 also communicates with the network monitoring control device 91, and performs various kinds of settings on the ROADM 90 in accordance with an instruction from the network monitoring control device 91. More specifically, the setting processing unit 1 performs settings on the optical simplifiers 20 and 24, the wavelength selective switches 21 and 23, the receivers 27, and the transmitters 28. The configuration of the setting processing unit 1 will be described later.

As the filter passbands corresponding to the respective selectable wavelengths are set in the wavelength selective switches 21 and 23, each optical signal wavelength-multiplexed with the multiple-wavelength optical signal Sm has its passband narrowed through filter passband accumulation, every time the optical signal passes through the ROADM 90. In a backbone network that performs long-distance transmission, for example, the number of signals to be subjected to adding/dropping is small, and accordingly, the influence of passband narrowing is small. In a metropolitan area network that performs short-distance transmission in a metropolitan area or the like, on the other hand, the number of signals to be subjected to adding/dropping is large, and therefore, the influence of passband narrowing is large.

An optical signal contains an error correction code such as an FEC code. In a case where the influence of passband narrowing is small, the use of an error correction code with a large overhead amount increases the optical signal transmission distance. However, the spectrum bandwidth of an optical signal becomes greater as the overhead amount of the error correction code becomes larger. Therefore, in a case where the influence of passband narrowing is large, the clock recovery of the optical signal results in a failure due to cutoff of the edges of the spectrum, and a demodulation process for the optical signal becomes impossible in some cases.

Figure 2:
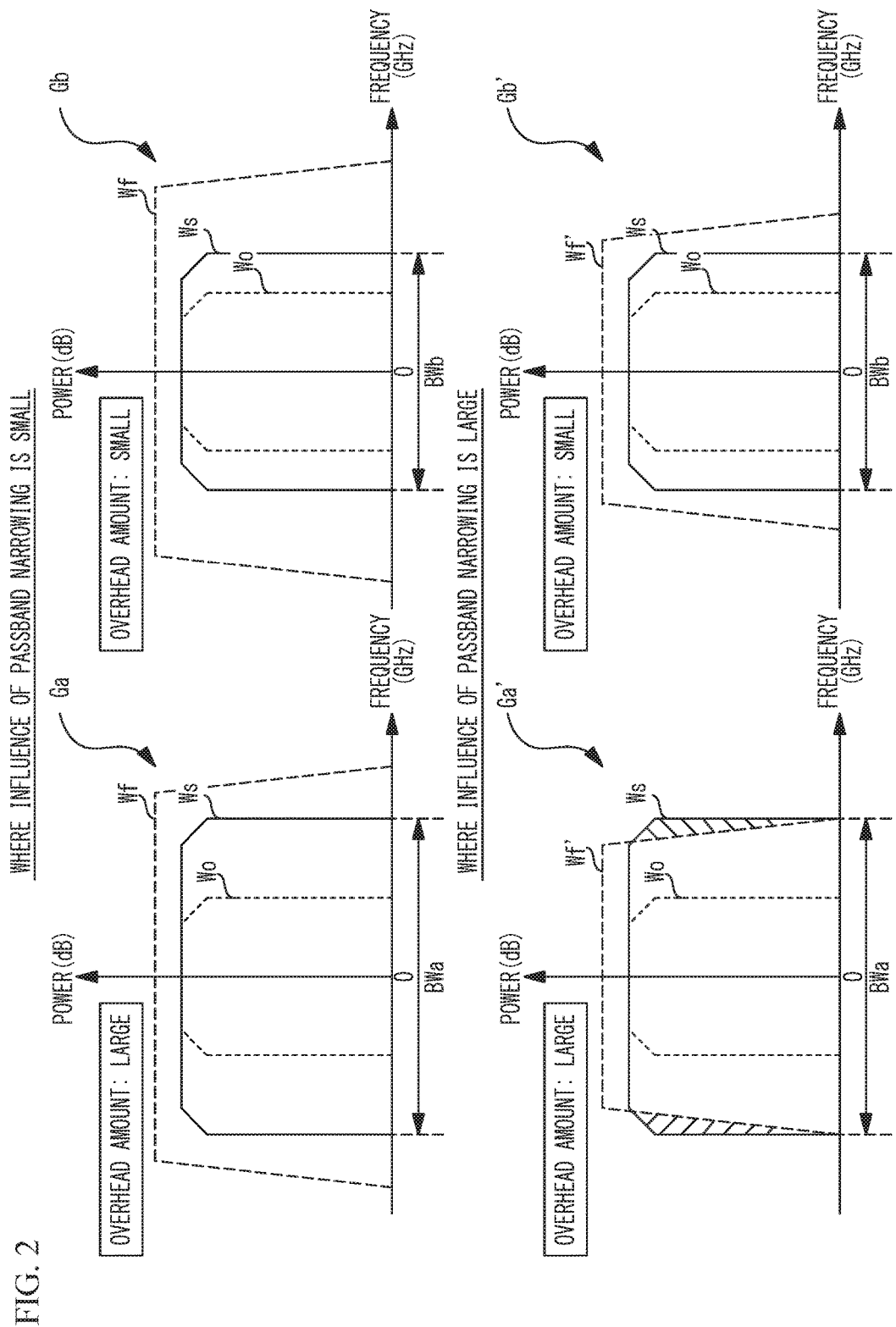
FIG. 2 is a diagram showing examples of the spectrums of optical signals depending on the overhead amount of an FEC code and the influence of passband narrowing.

FIG. 2 is a diagram showing examples of the spectrums of optical signals depending on the overhead amount of an FEC code and the influence of passband narrowing. In the graphs denoted by reference signs Ga, Gb, Ga', and Gb', the abscissa axis indicates frequency (GHz), and the ordinate axis indicates optical signal power (dB).

Reference sign Ga indicates an example of the spectrum Ws in a case where an FEC code with a large overhead amount is used when the influence of passband narrowing is small. Reference sign Gb indicates an example of the spectrum Ws in a case where an FEC code with a small overhead amount is used when the influence of passband narrowing is small. Further, reference sign Wo indicates the spectrum in a case where any FEC code is not used, and reference sign Wf indicates the transmission band in the optical transmission path.

The bandwidth BWa of the spectrum Ws in a case where the overhead amount is large is greater than the bandwidth BWb of the spectrum Ws in a case where the overhead amount is small. However, the width of the transmission band Wf is sufficiently greater than the bandwidths BWa and BWb, and therefore, the edges of the spectrum Ws are not cut off.

Meanwhile, reference sign Ga' indicates an example of the spectrum Ws in a case where an FEC code with a large overhead amount is used when the influence of passband narrowing is large, and reference sign Gb' indicates an example of the spectrum Ws in a case where an FEC code with a small overhead amount is used when the influence of passband narrowing is large. In this case, the width of the transmission band Wf' of the wavelength selective switches 21 and 23 is smaller than that of the transmission band Wf of the above described cases, and is small with respective to the bandwidth BWa of the spectrum Ws in a case where the overhead amount is large.

Therefore, the edges of the spectrum Ws in a case where the overhead amount is large are cut off as indicated by the shaded portions. In a case where the overhead amount is small, on the other hand, the width of the spectrum Ws is smaller than that of the transmission band Wf', and therefore, the edges of the spectrum Ws are not cut off. Because of this, in a case where the influence of passband narrowing is large, even if the overhead amount of the FEC code is made larger, the clock recovery of the optical signal results in a failure due to cutoff of the edges of the spectrum, and the transmission distance might not become longer.

Figure 3:
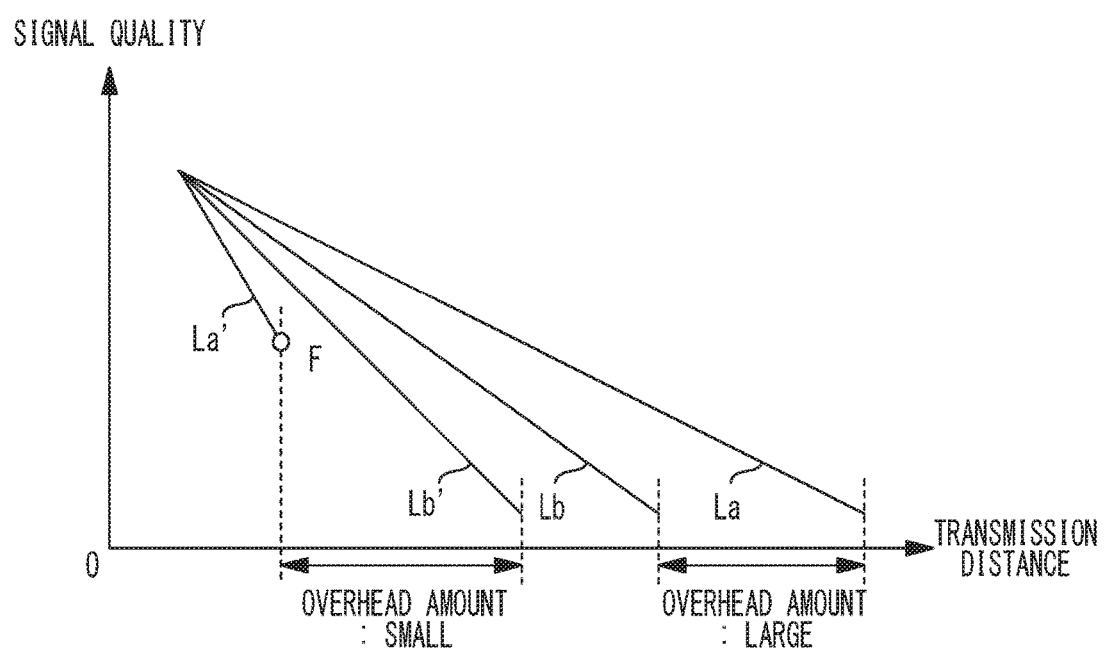
FIG. 3 is a diagram showing an example of the relationship between a transmission distance and signal quality depending on the overhead amount of an FEC code and the influence of passband narrowing.

FIG. 3 is a graph showing an example relationship between the transmission distance and the signal quality depending on the overhead amount of an FEC code and the influence of passband narrowing. In the graph shown in FIG. 3, the abscissa axis indicates transmission distance, and the ordinate axis indicates signal quality. Here, the signal quality may be a bit error rate or a Q value. The signal quality becomes lower as the transmission distance becomes longer.

Reference sign La indicates the relationship in a case where an FEC code with a large overhead amount is used when the influence of passband narrowing is small, and corresponds to the above mentioned optical signal denoted by reference sign Ga. Reference sign Lb indicates the relationship in a case where an FEC code with a small overhead amount is used when the influence of passband narrowing is small, and corresponds to the above mentioned optical signal denoted by reference sign Gb. In a case where the influence of passband narrowing is small, the transmission distance becomes longer as the overhead amount becomes larger.

Further, reference sign La' indicates the relationship in a case where an FEC code with a large overhead amount is used when the influence of passband narrowing is large, and corresponds to the above mentioned optical signal denoted by reference sign Ga'. Reference sign Lb' indicates the relationship in a case where an FEC code with a small overhead amount is used when the influence of passband narrowing is large, and corresponds to the above mentioned optical signal denoted by reference sign Gb'.

In a case where the influence of passband narrowing is large, if an FEC code with a large overhead amount is used, the clock recovery of the optical signal results in a failure for the above described reason, and therefore, the transmission distance does not become longer (see reference sign F). Because of this, in a case where the influence of passband narrowing is large, the transmission distance becomes longer as the overhead amount becomes smaller.

On the other hand, if the influence of passband narrowing is measured, for example, an appropriate error correction code can be selected in accordance with the result of the measurement. In the measurement, however, complicated calculations need to be performed from a large number of parameters relating to the network operation status, such as the number of signals to be subjected to adding/dropping in the network, for example.

Therefore, the ROADM 90 calculates an index value for narrowing of the passband of an optical signal from the spectrums of optical signals received from the other nodes #1 through #4. By doing so, the ROADM 90 easily measures the influence of passband narrowing. In this example, a decrease in narrowing indicating the smallness of narrowing of the passband of an optical signal St is used as an example of the index value for passband narrowing. However, the index value for passband narrowing is not limited to that, and a value indicating the greatness of narrowing of the passband of the optical signal St.

Figure 4:
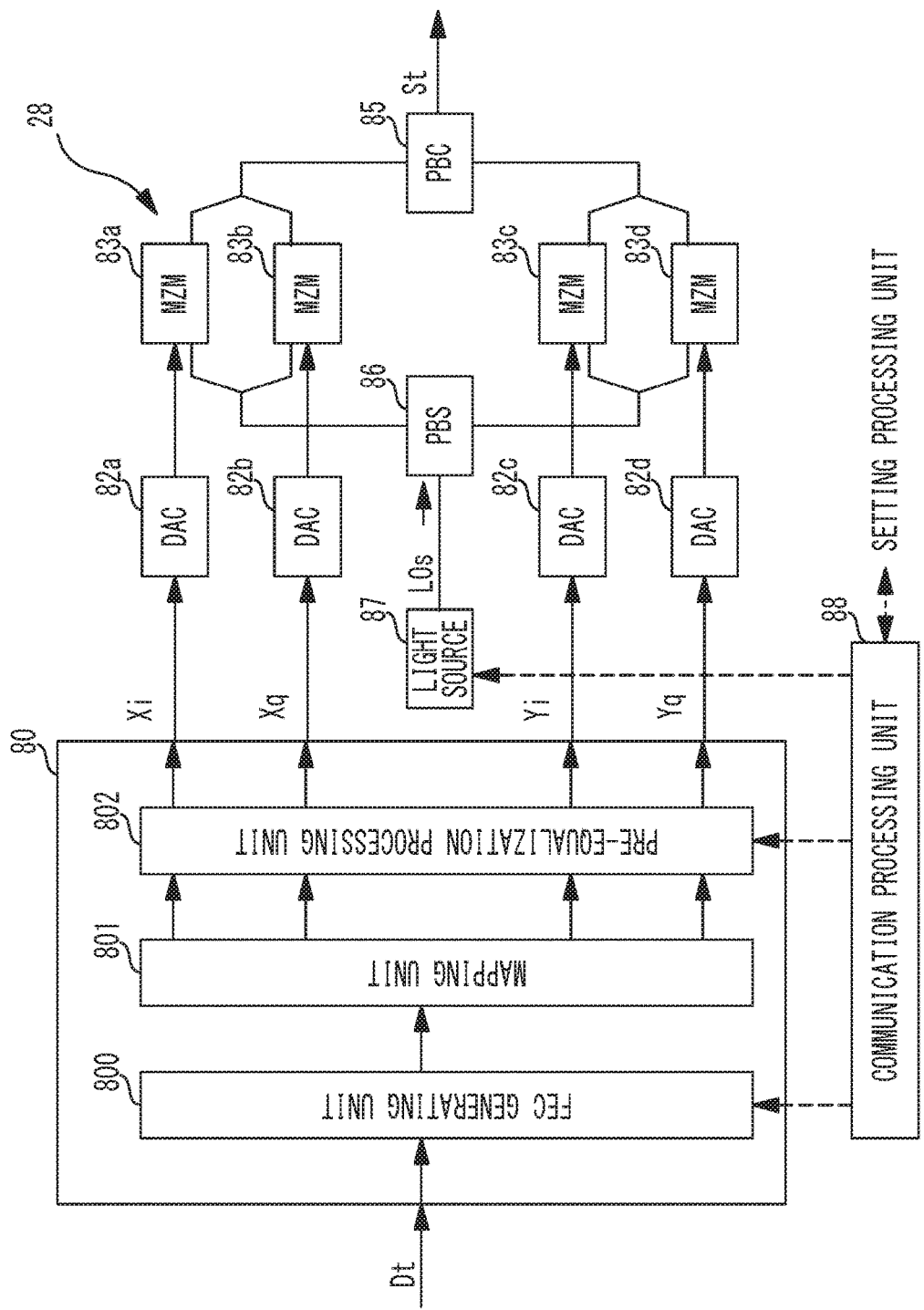
FIG. 4 is a configuration diagram showing an example of a transmitter.

FIG. 4 is a configuration diagram showing an example of the transmitter 28. The transmitter 28 transmits the optical signal St by a digital coherent optical transmission method, using a polarization multiplexing technique.

The transmitter 28 includes a transmission processing circuit 80, digital-to-analog converters (DACs) 82a through 82d, and Mach-Zehnder modulators (MZMs) 83a through 83d. The transmitter 28 further includes a polarization beam combiner (PBC) 85, a polarization beam splitter (PBS) 86, a light source 87, and a communication processing unit 88.

The transmission processing circuit 80 generates digital signals Xi, Xq, Yi, and Yq from a data signal Dt input from another device. The transmission processing circuit 80 includes an FEC generating unit 800, a mapping unit 801, and a pre-equalization processing unit 802. It should be noted that the transmission processing circuit 80 may be a digital signal processor (DSP), for example. However, the transmission processing circuit 80 is not necessarily a DSP, and may be a field programmable gate array (FPGA), for example. The transmission processing circuit 80 may further include functions other than the above.

The FEC generating unit 800 generates an FEC code from the data signal Dt, and adds the FEC code to the data signal Dt. It should be noted that the FEC code is an example of an error correction code. The FEC generating unit 800 outputs the data signal Dt having the FEC code added thereto, to the mapping unit 801.

The mapping unit 801 maps the data signal Dt onto a symbol of a modulation process (such as quadrature amplitude modulation (QAM)). The mapping unit 801 performs a process of mapping the data components of the data signal Dt to be allocated to X-polarized waves and Y-polarized waves. The mapping unit 801 outputs the data components for X-polarized waves and Y-polarized waves to the pre-equalization processing unit 802.

The pre-equalization processing unit 802 performs a pre-equalization process on the data components for X-polarized waves and Y-polarized waves. More specifically, the pre-equalization processing unit 802 prevents distortion of signal waveforms due to transmission path characteristics by electrically providing the data components beforehand with characteristics that are the opposite of the transmission path characteristics. It should be noted that the setting processing unit 1 provides the pre-equalization processing unit 802 with characteristics that are the opposite of those of the transmission band and are to be used in the pre-equalization process. The pre-equalization processing unit 802 outputs the data components for X-polarized waves and Y-polarized waves as digital signals Xi, Xq, Yi, and Yq to the DACs 82a through 82d, respectively.

Here, the digital signal Xi is an in-phase component of the X-polarized waves, and the digital signal Xq is an orthogonal component of the X-polarized waves. The digital signal Yi is an in-phase component of the Y-polarized waves, and the digital signal Yq is an orthogonal component of the Y-polarized waves.

The DACs 82a through 82d convert the digital signals Xi, Xq, Yi, and Yq into analog signals. The analog signals are input to the MZMs 83a through 83d. It should be noted that the DACs 82a through 82d may be formed in the transmission processing circuit 80.

The light source 87 is formed with a laser diode or the like, for example, and outputs transmission light LOs having a predetermined center frequency to the PBS 86. The PBS 86 divides the transmission light LOs into an X-axis component and a Y-axis (polarizing axis) component. The X-axis component of the transmission light LOs is input to each of the MZMs 83a and 83b, and the Y-axis component of the transmission light LOs is input to each of the MZMs 83c and 83d.

The MZMs 83a through 83d optically modulate the transmission light LOs in accordance with the analog signals from the DACs 82a through 82d. More specifically, the MZMs 83a and 83b optically modulate the X-axis component of the transmission light LOs in accordance with the analog signals from the DACs 82a and 82b, and the MZMs 83c and 83d optically modulate the Y-axis component of the transmission light LOs in accordance with the analog signals from the DACs 82c and 82d.

The optically-modulated X-axis components and Y-axis components of the transmission light LOs are input to the PBC 85. The PBC 85 generates an optical signal St by combining the polarized X-axis component and the polarized Y-axis component of the transmission light LOs, and outputs the optical signal St to the multicast switch 25.

The communication processing unit 88 is formed with a logic circuit such as an FPGA, for example, and processes communications between the transmitter 28 and the setting processing unit 1. Through the communication processing unit 88, the setting processing unit 1 sets an FEC code type (a Reed-Solomon code) in the FEC generating unit 800, and sets the center frequency of the optical signal St in the light source 87. Through the communication processing unit 88, the setting processing unit 1 also sets, in the pre-equalization processing unit 802, the characteristics that are the opposite of the transmission band and are to be used in the pre-equalization process.

Figure 5:
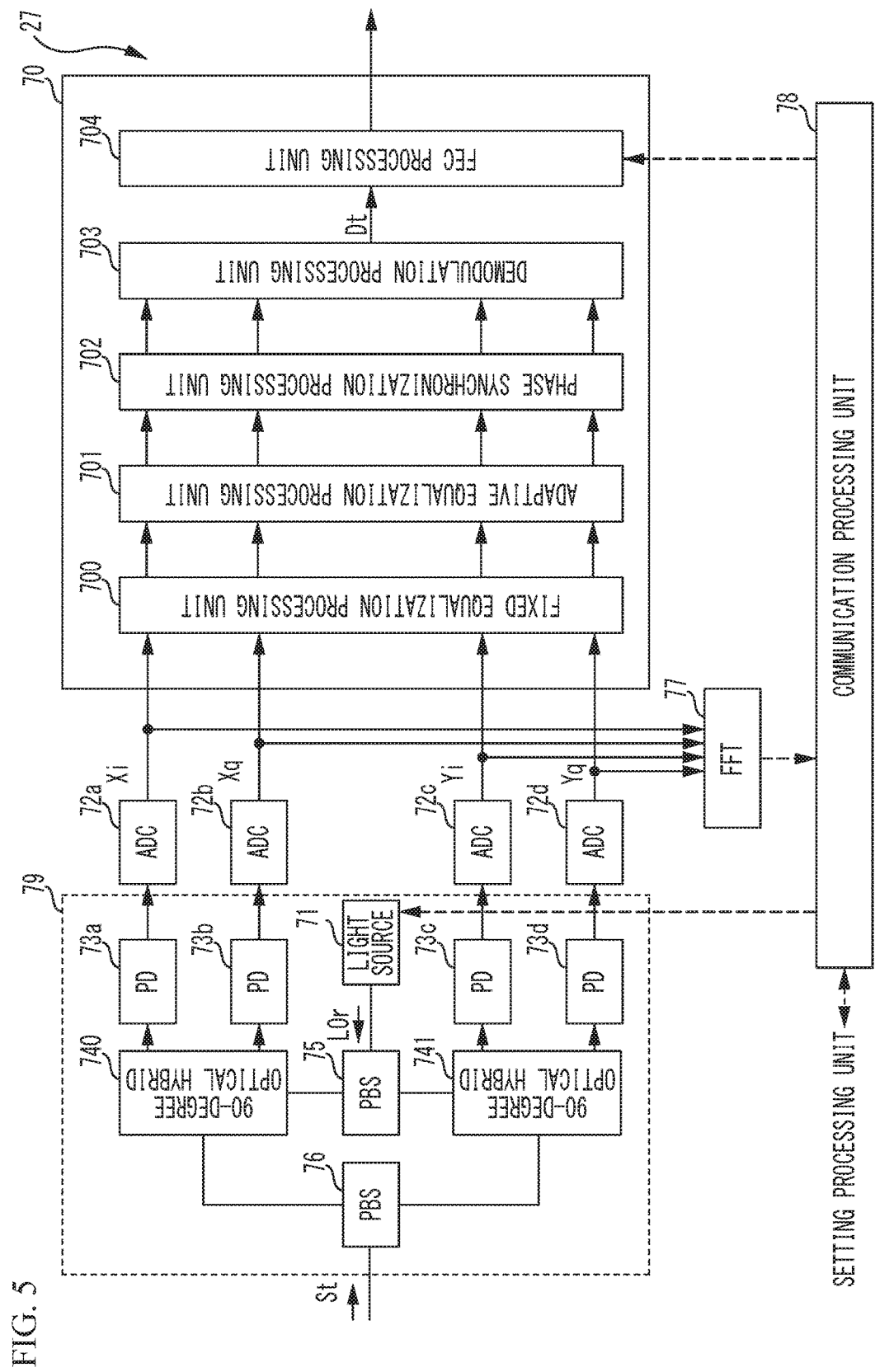
FIG. 5 is a configuration diagram showing an example of a receiver.

FIG. 5 is a configuration diagram showing an example of the receiver 27. The receiver 27 receives an optical signal St containing an in-phase component and an orthogonal component.

The receiver 27 includes a reception processing circuit 70, analog-to-digital converters (ADCs) 72a through 72d, a Fourier transform (fast Fourier transform: FFT) unit 77, a communication processing unit 78, and a coherent receiver 79. The coherent receiver 79 is an example of a receiving unit that receives the optical signal St, and includes a light source 71, photodiodes (PDs) 73a through 73d, 90-degree optical hybrid circuits 740 and 741, and PBSs 75 and 76.

The PBS 76 divides the optical signal St into the X-axis component and the Y-axis component, and outputs the X-axis component and the Y-axis component to the 90-degree optical hybrid circuits 740 and 741, respectively. The light source 71 is formed with a laser diode or the like, for example, and inputs local light LOr having a predetermined center frequency to the PBS 75. The PBS 75 divides the local light LOr into an X-axis component and a Y-axis component, and outputs the X-axis component and the Y-axis component to the 90-degree optical hybrid circuits 740 and 741, respectively.

The 90-degree optical hybrid circuit 740 includes a waveguide for causing interference between the X-axis component of the optical signal St and the X-axis component of the local light LOr, and detects the X-axis component of the optical signal St. The 90-degree optical hybrid circuit 740 outputs wave detection results that are optical components corresponding to the amplitudes and the phases of the in-phase component and the orthogonal component, to the PDs 73a and 73b, respectively.

The 90-degree optical hybrid circuit 741 includes a waveguide for causing interference between the Y-axis component of the optical signal St and the Y-axis component of the local light LOr, and detects the Y-axis component of the optical signal St. The 90-degree optical hybrid circuit 741 outputs wave detection results that are optical components corresponding to the amplitudes and the phases of the in-phase component and the orthogonal component, to the PDs 73c and 73d, respectively.

The PDs 73a through 73d convert the optical components input from the 90-degree optical hybrid circuits 740 and 741 into electrical signals, and output the electrical signals to the ADCs 72a through 72d, respectively. The ADCs 72a through 72d convert the electrical signals input from the PDs 73a through 73d into the digital signals Xi, Xq, Yi, and Yq, respectively. The digital signals Xi, Xq, Yi, and Yq are input to the reception processing circuit 70 and the Fourier transform unit 77.

The reception processing circuit 70 includes a fixed equalization processing unit 700, an adaptive equalization processing unit 701, a phase synchronization processing unit 702, a demodulation processing unit 703, and an FEC processing unit 704. It should be noted that the reception processing circuit 70 may be a DSP, for example. However, the reception processing circuit 70 is not necessarily a DSP, and may be an FPGA, for example. The reception processing circuit 70 may further include functions other than the above.

The fixed equalization processing unit 700 performs a fixed equalization process on the digital signals Xi, Xq, Yi, and Yq. More specifically, in accordance with fixed parameters, the fixed equalization processing unit 700 compensates for waveform distortion caused in the optical signal St due to waveform dispersion, a non-linear optical effect, or the like in the transmission path. The fixed equalization processing unit 700 outputs the digital signals Xi, Xq, Yi, and Yq to the adaptive equalization processing unit 701.

The adaptive equalization processing unit 701 performs an adaptive equalization process on the digital signals Xi, Xq, Yi, and Yq. More specifically, in accordance with dynamic parameters, the adaptive equalization processing unit 701 compensates for waveform distortion caused in the optical signal St due to waveform dispersion, a non-linear optical effect, or the like in the transmission path. The adaptive equalization processing unit 701 outputs the digital signals Xi, Xq, Yi, and Yq to the phase synchronization processing unit 702.

The phase synchronization processing unit 702 corrects the frequency difference and the phase difference between the light source 87 of the transmitter 28 and a local light source 2 so that the digital signals Xi, Xq, Yi, and Yq can be properly demodulated with signal constellation (a signal space diagram) compatible with the modulation method. The phase synchronization processing unit 702 outputs the digital signals Xi, Xq, Yi, and Yq to the demodulation processing unit 703.

The demodulation processing unit 703 performs a demodulation process on the digital signals Xi, Xq, Yi, and Yq by recognizing signal points in accordance with the signal constellation compatible with the modulation method. During the demodulation process, the demodulation processing unit 703 extracts clock signals from the digital signals Xi, Xq, Yi, and Yq (that is, clock recovery is conducted). Therefore, in a case where the influence of narrowing of the passband of the optical signal St is large, the demodulation processing unit 703 might fail in the clock recovery, and become unable to perform a demodulation process, as described above. The demodulation processing unit 703 outputs the data signal Dt obtained through the demodulation process to the FEC processing unit 704.

The FEC processing unit 704 corrects the data error in the data signal Dt with the FEC code. The FEC processing unit 704 outputs the data signal Dt to another device.

The Fourier transform unit 77 generates spectrum information relating to the spectrum of the optical signal St by performing fast Fourier transform on the digital signals Xi, Xq, Yi, and Yq. It should be noted that the digital signals Xi, Xq, Yi, and Xq are input to the Fourier transform unit 77 of this example from the ADCs 72a through 72d. However, the digital signals Xi, Xq, Yi, and Yq are not necessarily input from the ADCs 72a through 72d, and may be input from the fixed equalization processing unit 700, the adaptive equalization processing unit 701, or the phase synchronization processing unit 702.

The communication processing unit 78 is formed with a logic circuit such as an FPGA, for example, and processes communications between the receiver 27 and the setting processing unit 1. Through the communication processing unit 78, the setting processing unit 1 sets an FEC code type in the FEC processing unit 704, and sets the center frequency of the optical signal St in the light source 71. Through the communication processing unit 78, the setting processing unit 1 also acquires the spectrum information from the Fourier transform unit 77. The spectrum information is to be used for calculating the decrease in the narrowing of the passband of the optical signal St, as will be described later.

The network monitoring control device 91 predicts the decrease in the narrowing of the passband of the optical signal St before transmission of the optical signal St (multiple-wavelength optical signal Sm) is started among the ROADMs 90 of the respective nodes #1 through #4. In accordance with a result of the precision, the network monitoring control device 91 sets a FEC code type and the center frequency of the optical signal St in the transmitters 28 and the receivers 27.

Figure 6:
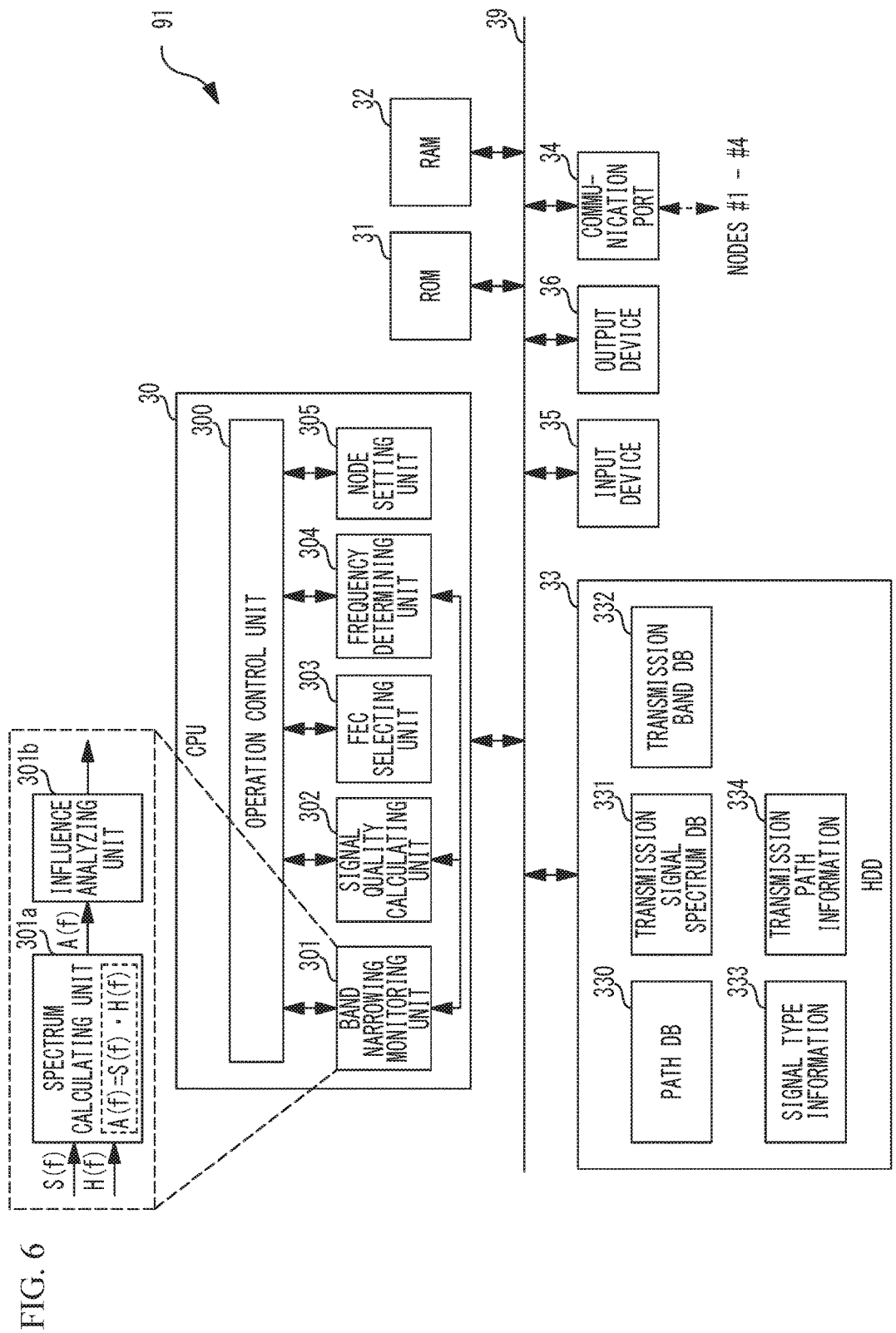
FIG. 6 is a configuration diagram showing an example of a network monitoring control device.

FIG. 6 is a configuration diagram showing an example of the network monitoring control device 91. The network monitoring control device 91 includes a central processing unit (CPU) 30, a read only memory (ROM) 31, a random access memory (RAM) 32, a hard disk drive (HDD) 33, a communication port 34, an input device, 35, and an output device 36. The CPU 30 is connected to the ROM 31, the RAM 32, the HDD, 33, the communication port 34, the input device 35, and the output device 36 via a bus 39, so that signals can be input/output to one another.

The ROM 31 stores a program for driving the CPU 30. The RAM 32 functions as a working memory of the CPU 30. The communication port 34 is a LAN switch, for example, and processes communications with the ROADMs 90 of the respective nodes #1 through #4.

The input device 35 is a device that inputs information to the network monitoring control device 91. The input device 35 may be a keyboard, a mouse, a touch panel, or the like, for example. The input device 35 outputs input information to the CPU 30 via the bus 39.

The output device 36 is a device that outputs information about the network monitoring control device 91. The output device 36 may be a display, a touch panel, a printer, or the like, for example. The output device 36 acquires information from the CPU 30 via the bus 39, and then outputs the information.

As the CPU 30 reads the program from the ROM 31, an operation control unit 300, a band narrowing monitoring unit 301, a signal quality calculating unit 302, an FEC selecting unit 303, a frequency determining unit 304, and a node setting unit 305 are formed as functions. Meanwhile, the HDD 33 stores a path database (DB) 330, a transmission signal spectrum database (DB) 331, a transmission band database (DB) 332, signal type information 333, and transmission path information 334.

The operation control unit 300 controls operation of the entire network monitoring control device 91. In accordance with a predetermined sequence, the operation control unit 300 issues operation instructions to the band narrowing monitoring unit 301, the signal quality calculating unit 302, the FEC selecting unit 303, the frequency determining unit 304, and the node setting unit 305.

Combinations of the transmitters 28 and the receiver 27 that transmit/receive optical signals St via optical paths are registered in the path DB 330. The operation control unit 300 selects a combination of the transmitter 28 and the receiver 27 from the path DB 330, and performs a process of predicting the decrease in narrowing and the signal quality of the optical signal St. The operation control unit 300 instructs the band narrowing monitoring unit 301 to predict the decrease in narrowing.

The band narrowing monitoring unit 301 predicts the decrease in narrowing from the transmission signal spectrum DB 331 and the transmission band DB 332. Transmission spectrum information S(f) indicating the spectrum of an optical signal St at the time of transmission is registered for each transmitter 28 in the transmission signal spectrum DB 331. The transmission spectrum information S(f) includes the variation with respect to changes in the center frequency f of the optical signal St for each FEC code type to be used in optical signals St.

Transmission band information H(f) indicating the transmission band in the transmission path along the optical path of an optical signal St is registered in the transmission band DB 332. It should be noted that the transmission spectrum information S(f) and the transmission band information H(f) may be information calculated through simulations, or may be information obtained through actual measurement. In measuring the transmission band information H(f), it is possible to use the method disclosed in the reference "G. Wellbrock, et al., OFC 2010, NWC 1.", or the method disclosed in Japanese Patent Application Laid-Open No. 2017-38228, for example.

$$A(f) = S(f) \cdot H(f) \quad (1)$$

The band narrowing monitoring unit 301 includes a spectrum calculating unit 301a and an influence analyzing unit 301b. The spectrum calculating unit 301a calculates reception spectrum information A(f) from the transmission spectrum information S(f) and the transmission band information H(f) according to the above expression (1), for example. The reception spectrum information A(f) indicates the spectrum of an optical signal St to be received by the receiver 27 or an optical signal St after transmission. The spectrum calculating unit 301a outputs the reception spectrum information A(f) to the influence analyzing unit 301b.

The influence analyzing unit 301b analyzes the influence of passband narrowing from the reception spectrum information A(f). The influence analyzing unit 301b calculates a decrease in narrowing, by calculating the sampling timing error in a case where a clock signal is extracted from an optical signal St in accordance with the reception spectrum information A(f). That is, the influence analyzing unit 301b calculates a decrease in narrowing, using the characteristics of the sampling timing error detector that is used in the clock recovery.

$$e = \sum_{k=1}^{m} \{I_{2k}(I_{2k+1} - I_{2k-1}) + Q_{2k}(Q_{2k+1} - Q_{2k-1})\} \quad (2)$$

$$e = \sum_{k=1}^{m} P_{2k}(P_{2k+1} - P_{2k-1}) \quad (3)$$

$$P_k = |I_k|^2 + |Q_k|^2 \quad (4)$$

More specifically, the influence analyzing unit 301b calculates a decrease in narrowing, using the above expression (2) or (3), and the above expression (4). The expression (2) is an expression for calculating a sampling timing error e according to the Gardner method, and the expressions (3) and (4) are expressions for calculating a sampling timing error e according to the Yan method. A sampling timing error e is a deviation from an appropriate timing phase in a case where a clock signal is extracted from an optical signal St.

In the expressions (2) and (4), the variable I is an in-phase component of the optical signal St, and the variable Q is an orthogonal component of the optical signal St. In the expressions (3) and (4), P represents the power of the optical signal St. Meanwhile, the variable m is a positive integer. The Gardner method is disclosed in the reference "F. M. Gardner, IEEE Trans. On Commun., VOL. COM-34, No. 5, pp. 423-429, 1986", and the YAN method is disclosed in the reference "M. Yan, et al., OFC 2013, OTu 21. 7.".

The influence analyzing unit 301b acquires the variables I and Q from the reception spectrum information A(f). Examples of the method to be implemented by the influence analyzing unit 301b in calculating a decrease in narrowing includes the following three methods.

Calculation Method (1)

The influence analyzing unit 301b acquires a spectrum by performing Fourier transform on the underlined portion of the expression (2) or (3), and calculates the power of the clock frequency component in the spectrum as the decrease in narrowing.

Figure 7:
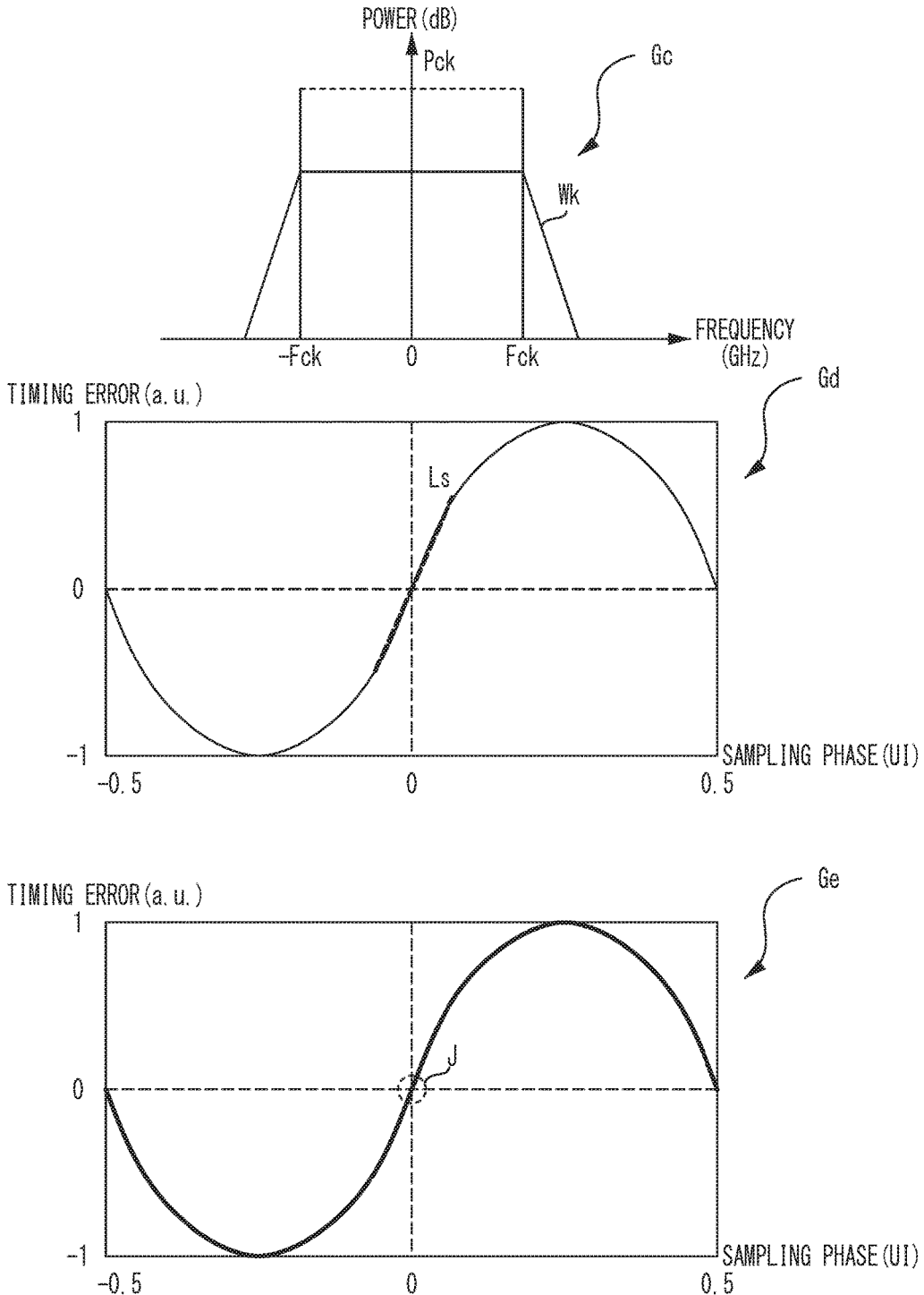
FIG. 7 is a diagram showing the clock frequency component in a spectrum, and an example of changes in the timing error with respect to changes in the sampling phase.

Reference sign Gc in FIG. 7 indicates an example of the clock frequency component in the spectrum. In the graph indicated by reference sign Gc, the abscissa axis indicates frequency (GHz), and the ordinate axis indicates power (dB). Reference sign Wk indicates the spectrum to be obtained through the Fourier transform performed on the underlined portion of the expression (2) or (3).

The influence analyzing unit 301b calculates the power Pck of the component at a predetermined clock frequency Fck. In a case where the influence of passband narrowing is large, the power Pck decreases. Because of this, the influence analyzing unit 301b calculates the power Pck as the decrease in narrowing.

Calculation Method (2)

The influence analyzing unit 301b calculates the characteristics of a change in the timing error with respect to a change in the sampling phase, according to the expression (2) or (3).

Reference sign Gd in FIG. 7 indicates an example of a change in the timing error with respect to a change in the sampling phase. In the graph indicated by reference sign Gd, the abscissa axis indicates the sampling phase (UI), and the ordinate axis indicates the timing error (a. u.). The characteristics of changes in the timing error with respect to changes in the sampling phase are called an "S curve". The points at which the S curve intersects with the abscissa axis are called "zero-cross portions", and are regarded as ideal sampling phases.

The slope Ls of the S curve at the zero-cross portions indicate sensitivity. As the slope Ls is steeper, the sensitivity is higher, and the influence of passband narrowing is smaller. Because of this, the influence analyzing unit 301b calculates the slope Ls as the decrease in narrowing.

Calculation Method (3)

The influence analyzing unit 301b calculates the characteristics of a change in the timing error with respect to a change in the sampling phase, according to the expression (2) or (3).

Reference sign Ge in FIG. 7 indicates an example of a change in the timing error with respect to a change in the sampling phase. In the graph indicated by reference sign Ge, the abscissa axis indicates the sampling phase (UI), and the ordinate axis indicates the timing error (a. u.).

The influence analyzing unit 301b calculates the reception spectrum information A(f) during a sufficient period for measuring the jitter of the S curve. The jitter J of each zero-cross portion is larger where the influence of passband narrowing is larger. Because of this, the influence analyzing unit 301b calculates the jitter J of the zero-cross portions as the decrease in narrowing.

As described above, the influence analyzing unit 301b calculates a decrease in narrowing by calculating a sampling timing error e in a case where a clock signal is extracted from an optical signal St, in accordance with reception spectrum information. Thus, the influence analyzing unit 301b can easily calculate a decrease in narrowing, without a complicated calculation from a large number of parameters relating to the network operation status, such as the number of signals to be subjected to adding/dropping in the network.

Referring back to FIG. 6, the influence analyzing unit 301b outputs the decrease in narrowing to the operation control unit 300. The operation control unit 300 instructs the signal quality calculating unit 302 to calculate the signal quality of the optical signal St.

In accordance with the instruction from the operation control unit 300, the signal quality calculating unit 302 calculates the signal quality of the optical signal St from the signal type information 333 and the transmission path information 334 for each FEC code type. At this stage, the signal quality calculating unit 302 calculates the signal quality with respect to the predetermined center frequency f assigned to the channel of the optical signal St.

The signal type information 333 includes the modulation format and the baud rate of the optical signal St for each optical path, for example. The transmission path information 334 includes the type, the length, the loss, the dispersion, the non-linear coefficient, and the input power of the optical fiber, and the number of steps and the noise factor of the optical amplifiers 20 and 24 for each optical path, for example.

The signal quality calculating unit 302 calculates the index value for signal quality (hereinafter referred to as the "signal quality value") that is a bit error rate, a Q value, or the amount of margin from a predetermined threshold value such as an FEC threshold value. The signal quality calculating unit 302 may calculate the signal quality value from the databases of the signal type information 333 and the transmission path information 334, but may also calculate signal quality using a gaussian noise model.

$$OSNR_{total} = P_{sig}/(P_{ASE} + P_{NLI}) \quad (5)$$

In this case, the signal quality calculating unit 302 can analytically calculate the power $P_{NLI}$ of non-linear noise in the above expression (5) for calculating the optical signal-to-noise ratio $OSNR_{total}$ of the transmission path. In the expression (5), the variable $P_{sig}$ represents the power of the optical signal St, and the variable $P_{ASE}$ represents the power of noise of the optical amplifiers 20 and 24. The method of calculating a gaussian noise model is disclosed in the reference "P. Poggiolini, "The GN Model of Non-Linier Propagation in Uncompensated Coherent optical Systems", JOURNAL OF LIGHTWAVE TECHNOLOGY, VOL. 30, NO. 24, pp. 3857-3879, Dec. 15, 2012".

The signal quality calculating unit 302 outputs the signal quality value to the operation control unit 300. The operation control unit 300 outputs the decrease in narrowing input from the influence analyzing unit 301b and the signal quality value input from the signal quality calculating unit 302 to the FEC selecting unit 303. The FEC selecting unit 303 selects an FEC code type for the optical signal St in accordance with the signal quality value and the decrease in narrowing. More specifically, the FEC selecting unit 303 selects an FEC code type with which the signal quality value and the decrease in narrowing are not smaller than predetermined threshold values.

Figure 8:
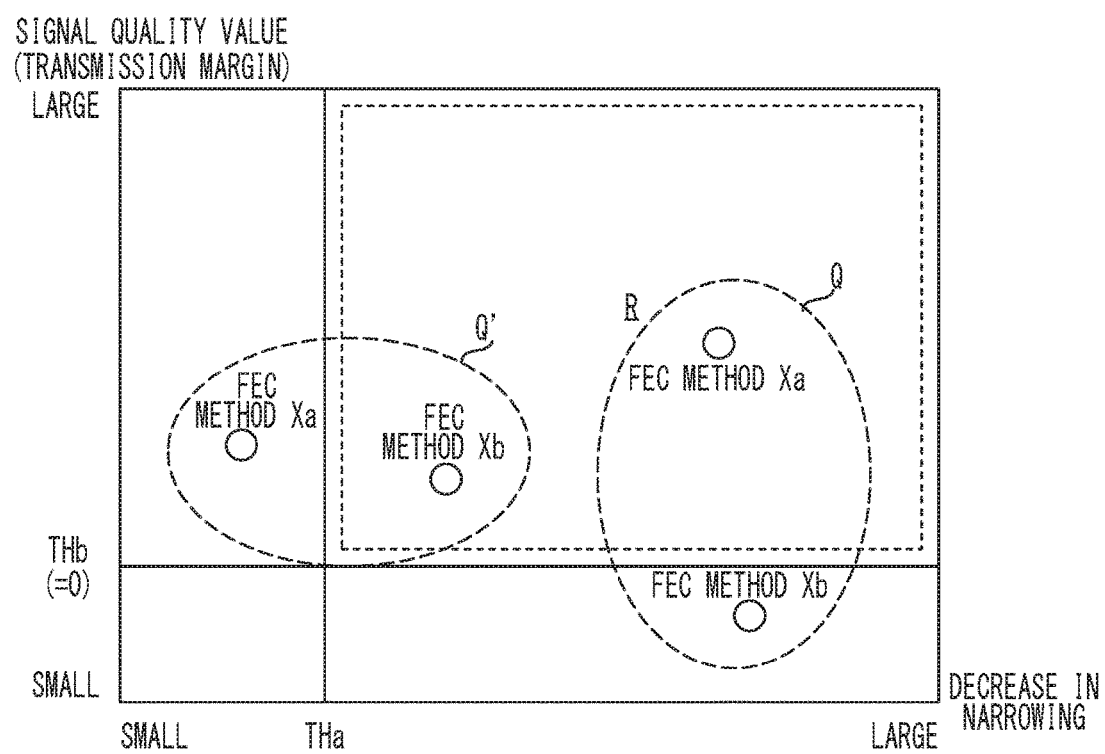
FIG. 8 is a diagram showing an example of decreases in narrowing and signal quality values for respective FEC methods.

FIG. 8 is a diagram showing an example of the decrease in narrowing and the signal quality value for each FEC method. In the graph shown in FIG. 8, the abscissa axis indicates the decrease in narrowing, and the ordinate axis indicates the signal quality value. In this example, the signal quality value is a transmission margin obtained from the difference between the Q value after transmission of the optical signal St and the FEC threshold value. However, the signal quality value is not necessarily such a transmission margin.

Reference sign R indicates a region where the decrease in narrowing is equal to or greater than a predetermined threshold value THa, and the signal quality value is equal to or greater than a predetermined threshold value THb (=0). Reference sign Q indicates a region where the influence of passband narrowing is not dominant in the transmission path of the optical signal St. Reference sign Q' indicates a region where the influence of passband narrowing is dominant in the transmission system (the path in the ROADM 90 and the transmission path) for the optical signal St.

This example shows the decreases in narrowing and the signal quality values of FEC code types according to an FEC method Xa that involves an FEC code with a large overhead amount and an FEC method Xb that involves an FEC code with a small overhead amount. The FEC method Xa corresponds to the cases denoted by reference signs Ga and Ga' in FIG. 2, and the FEC method Xb corresponds to the cases denoted by reference signs Gb and Gb' in FIG. 2.

In a case where the influence of passband narrowing is not dominant (reference sign Q), the decrease in narrowing is equal to or greater than the threshold value THa when either of the FEC methods Xa and Xb is used, but the signal quality value is equal to or greater than the threshold value THb only when the FEC method Xa is used. This is because the overhead amount of an FEC code according to the FEC method Xb is small, and accordingly, the gain is low, resulting in an insufficient transmission margin.

For this reason, the decrease in narrowing and the signal quality when the FEC method Xa is used fall within the region R, but the decrease in narrowing and the signal quality when the FEC method Xb is used are outside the region R. Therefore, the FEC selecting unit 303 selects the FEC method Xa as the FEC code type.

In a case where the influence of passband narrowing is dominant (reference sign Q'), the signal quality value is equal to or greater than the threshold value THb when either of the FEC methods Xa and Xb is used, but the decrease in narrowing is equal to or greater than the threshold value THa only when the FEC method Xb is used. This is because the overhead amount of an FEC code according to the FEC method Xa is large, and accordingly, the width of the spectrum becomes greater than that with the FEC method Xb, resulting in a very large decrease in passband narrowing.

For this reason, the decrease in narrowing and the signal quality when the FEC method Xb is used fall within the region R, but the decrease in narrowing and the signal quality when the FEC method Xa is used are outside the region R. Therefore, the FEC selecting unit 303 selects the FEC method Xb as the FEC code type.

In a case where more than one decrease in narrowing and more than one signal quality value according to the FEC methods Xa and Xb fall within the region R, the FEC selecting unit 303 selects the FEC method Xa or Xb in accordance with a predetermined policy. For example, in a case where emphasis is on power consumption reduction, the FEC selecting unit 303 selects the FEC method Xb that involves a smaller overhead amount. In a case where emphasis is on the signal quality margin, the FEC selecting unit 303 selects the FEC method Xa that achieves the highest signal quality. In a case where emphasis is on the margin of the decrease in narrowing, the FEC selecting unit 303 selects the FEC method Xb that achieves the largest decrease in narrowing.

Referring back to FIG. 6, the FEC selecting unit 303 notifies the operation control unit 300 of the selected FEC method Xa or Xb, or the error correction code type. The operation control unit 300 notifies the frequency determining unit 304 of the selected FEC method Xa or Xb, and instructs the frequency determining unit 304 to determine the optimum center frequency of the optical signal St.

In accordance with the instruction from the operation control unit 300, the frequency determining unit 304 determines the optimum center frequency of the optical signal St. More specifically, the frequency determining unit 304 requests the band narrowing monitoring unit 301 and the signal quality calculating unit 302 to calculate the characteristics of changes in the decrease in narrowing and the signal quality value with respect to a change in the center frequency when the selected FEC method Xa or Xb is used. In doing so, the frequency determining unit 304 notifies the band narrowing monitoring unit 301 and the signal quality calculating unit 302 of the ranges of change in the center frequency according to the FEC methods Xa and Xb.

In response to the request from the frequency determining unit 304, the band narrowing monitoring unit 301 calculates the characteristics of a change in the decrease in narrowing with respect to a change in the center frequency when the selected FEC method Xa or Xb is used. In doing so, the band narrowing monitoring unit 301 acquires the transmission spectrum information and the transmission band information corresponding to the center frequency range designated by the frequency determining unit 304, from the transmission signal spectrum DB 331 and the transmission band DB 332, respectively. The band narrowing monitoring unit 301 outputs the data of the calculated characteristics of a change in the decrease in narrowing to the frequency determining unit 304.

Meanwhile, in response to the request from the frequency determining unit 304, the signal quality calculating unit 302 calculates the characteristics of a change in the signal quality value with respect to a change in the center frequency when the selected FEC method Xa or Xb is used. The signal quality calculating unit 302 outputs the data of the calculated characteristics of a change in the signal quality value to the frequency determining unit 304.

Figure 9:
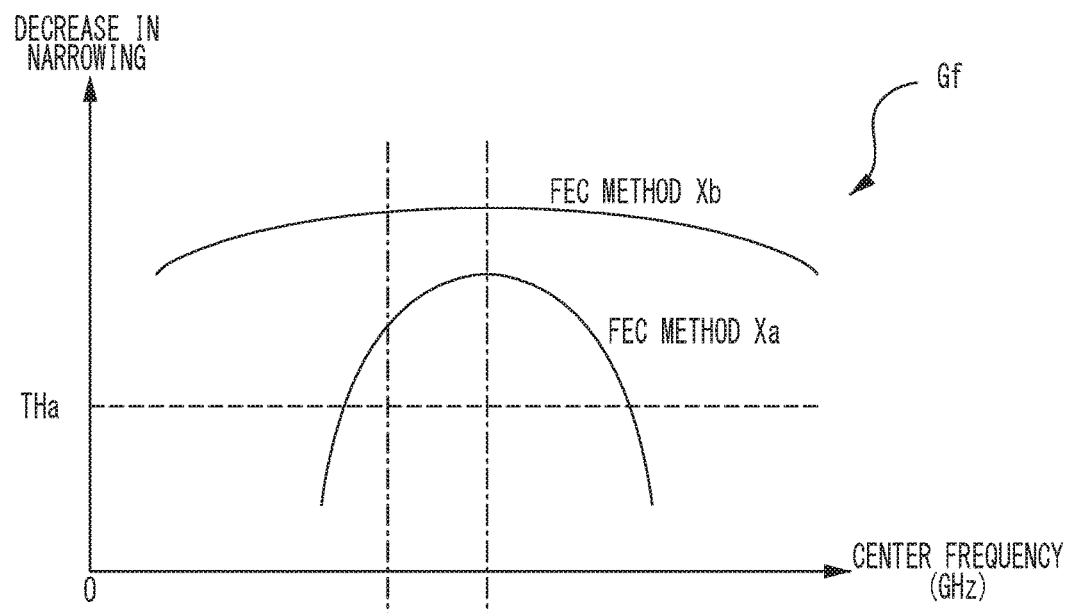
FIG. 9 is a diagram showing an example of changes in the decreases in narrowing and the signal quality values with respect to the center frequencies for the respective FEC methods.
Figure 9:
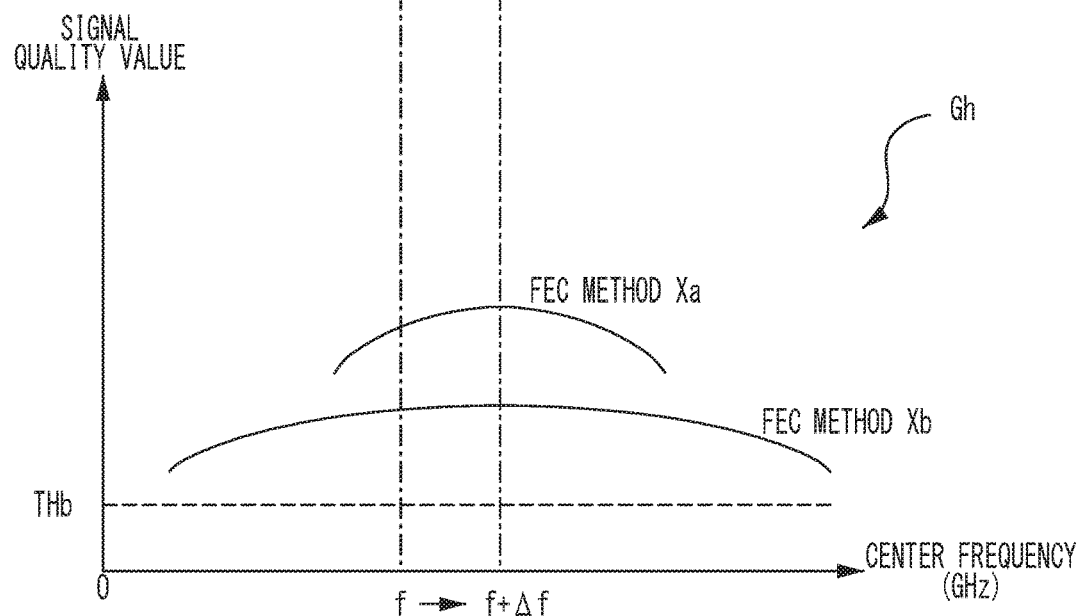

FIG. 9 is a diagram showing an example of changes in the decrease in narrowing and the signal quality value with respect to the center frequency for each of the FEC methods Xa and Xb. Reference sign Gf indicates an example of changes in the decrease in narrowing with respect to the center frequency, and reference sign Gh indicates an example of changes in the signal quality value with respect to the center frequency.

When the center frequency is an initial value f, the decrease in narrowing and the signal quality value are equal to or greater than the respective threshold values THa and THb, but the differences from the respective maximum values are large. Therefore, the frequency determining unit 304 determines the center frequency at f+Δf so that the differences from the maximum values of the decrease in narrowing and the signal quality value becomes equal to or smaller than predetermined values, or that the decrease in narrowing and the signal quality value approach the respective maximum values. It should be noted that the adjustment value Δf for the center frequency is determined within such a range that the band of the optical signal St does not overlap the bands of the adjacent channels.

Referring back to FIG. 6, the frequency determining unit 304 notifies the operation control unit 300 of the determined center frequency (f+Δf). The operation control unit 300 notifies the node setting unit 305 of the selected FEC method Xa or Xb and the determined center frequency (f+Δf), and instructs the node setting unit 305 to perform an FEC and center frequency setting process on the corresponding one of the nodes #1 through #4.

In accordance with the instruction from the operation control unit 300, the node setting unit 305 performs a process of setting an FEC code type and a center frequency in the corresponding one of the nodes #1 through #4. More specifically, the node setting unit 305 notifies the corresponding one of the nodes #1 through #4 of the selected FEC method Xa or Xb and the determined center frequency (f+Δf) via the communication port 34.

In the nodes #1 through #4 on the side of transmission of the optical signal St, the setting processing unit 1 sets the FEC code type corresponding to the FEC method Xa or Xb in the FEC generating unit 800 via the communication processing unit 88. The setting processing unit 1 also sets the center frequency (f+Δf) in the light source 87 via the communication processing unit 88, and further sets the center frequency (f+Δf) for the corresponding channel in the wavelength selective switch 23.

In the nodes #1 through #4 on the side of reception of the optical signal St, the setting processing unit 1 also sets the FEC code type corresponding to the FEC method Xa or Xb in the FEC processing unit 704 via the communication processing unit 78. The setting processing unit 1 also sets the center frequency (f+Δf) in the light source 71 via the communication processing unit 78, and further sets the center frequency (f+Δf) for the corresponding channel in the wavelength selective switch 21.

In this manner, the network monitoring control device 91 predicts a decrease in passband narrowing and the signal quality of an optical signal St, and sets the FEC method Xa or Xb and the center frequency (f+Δf) corresponding to the prediction results in each of the nodes #1 through #4. Thus, the network monitoring control device 91 can improve the transmission characteristics of the optical signal St in accordance with the results of prediction of the decrease in passband narrowing and the signal quality of the optical signal St, and make the transmission distance longer.

Figure 10:
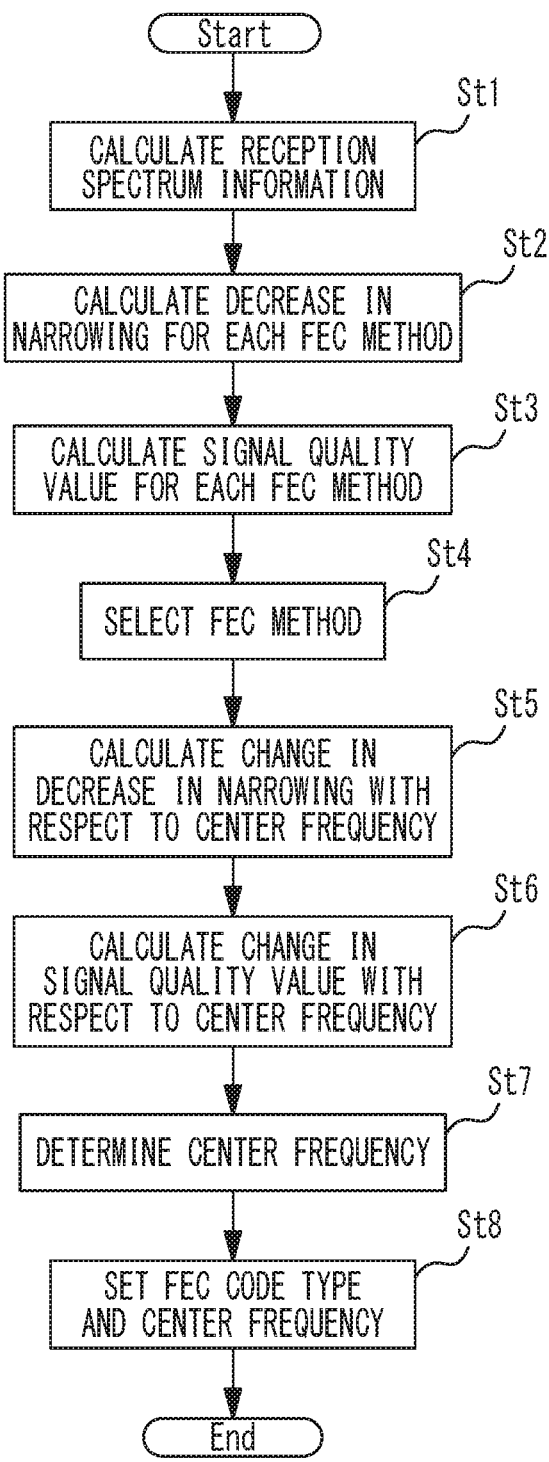
FIG. 10 is a flowchart showing an example operation of the network monitoring control device.

FIG. 10 is a flowchart showing an example of operation of the network monitoring control device 91. The network monitoring control device 91 performs the following process for each optical signal St in each optical path prior to a start of transmission.

The spectrum calculating unit 301a calculates the reception spectrum information A(f) from the transmission signal spectrum DB 331 and the transmission band DB 332 (step St1). By doing so, the spectrum calculating unit 301a predicts the spectrum of an optical signal St to be received by the receiver 27.

The influence analyzing unit 301b then calculates the decrease in narrowing of the passband of the optical signal St for each of the FEC methods Xa and Xb (step St12). In this step, the influence analyzing unit 301b calculates the decrease in narrowing by calculating the sampling timing error e in a case where a clock signal is extracted from an optical signal, according to the above expressions (2) through (4). Thus, the influence analyzing unit 301b can easily predict the decrease in narrowing.

The signal quality calculating unit 302 calculates the signal quality value of the optical signal St for each of the FEC methods Xa and Xb, from the signal type information 333 and the transmission path information 334 (step St3). It should be noted that, in the calculation processes in steps St2 and St3, the predetermined value f (the initial value) assigned to the corresponding channel is used as the center frequency of the optical signal St.

The FEC selecting unit 303 then selects the FEC method Xa or Xb in accordance with the decrease in narrowing and the signal quality value (step St4). In this manner, the appropriate FEC method Xa or Xb corresponding to the decrease in narrowing and the signal quality value is selected with respect to the center frequency f.

The influence analyzing unit 301b then calculates a change in the decrease in narrowing with respect to the center frequency (step St5). The signal quality calculating unit 302 then calculates a change in the signal quality value with respect to the center frequency (step St6). As a result, the characteristics of changes in the decrease in narrowing and the signal quality value with respect to the center frequency are obtained for the selected FEC method Xa or Xb.

The frequency determining unit 304 then determines the optimum center frequency (f+Δf) from the characteristics of changes in the decrease in narrowing and the signal quality value with respect to the center frequency (step St7). The node setting unit 305 then sets the FEC code type corresponding to the selected FEC method Xa or Xb and the determined center frequency (f+Δf) in the corresponding one of the nodes #1 through #4 (step St8). In this manner, the transmission characteristics of the optical signal St improve, and the transmission distance becomes longer.

In this example, the network monitoring control device 91 selects the FEC method Xa or Xb and determines the optimum center frequency (f+Δf), in accordance with the decrease in narrowing and the signal quality value. However, the network monitoring control device 91 may select the FEC method Xa or Xb and determine the optimum center frequency (f+Δf), in accordance only with the decrease in narrowing. Alternatively, the network monitoring control device 91 may select not only the FEC method Xa or Xb but also the modulation method and the baud rate for the optical signal St, in accordance with the decrease in narrowing as in the same manner as described above. In such a case, if the decrease in narrowing is large, the network monitoring control device 91 can halve the spectrum width of the optical signal St by changing the modulation method from quadrature phase shift-keying (QPSK) to 16QAM, for example.

In a case where there are neither the FEC methods Xa and Xb nor the center frequency (f+Δf) with which the decrease in narrowing is equal to or greater than the threshold value THa, the network monitoring control device 91 may instruct the corresponding one of the nodes #1 through #4 to perform a pre-equalization process for the optical signal St. More specifically, in a case where there are neither appropriate FEC methods Xa and Xb nor an appropriate center frequency (f+Δf), the operation control unit 300 instructs the node setting unit 305 to set a pre-equalization process in the corresponding one of the nodes #1 through #4.

In accordance with the instruction from the operation control unit 300, the node setting unit 305 instructs the corresponding one of the nodes #1 through #4 to perform a pre-equalization process, via the communication port 34. In doing so, the node setting unit 305 notifies the corresponding one of the nodes #1 through #4 of information about the characteristics ($H^{-1}(f)$) that are the opposite of the transmission band (the above mentioned H(f)) to be used in the pre-equalization process. In the corresponding one of the nodes #1 through #4, the setting processing unit 1 sets the pre-equalization process corresponding to the information about the opposite characteristics of the transmission band in the pre-equalization processing unit 802 via the communication processing unit 88. It should be noted that the setting processing unit 1 may acquire the opposite characteristics of the transmission band from the transmission band DB 332, or from an actually measured transmission band as described above.

In a case where the pre-equalization processing unit 802 performs a pre-equalization process with an excess compensation amount in the transmitter 28, the output power of the MZMs 83a through 83d decreases due to the limited resolution of the DACs 82a through 82d in the subsequent stage, and therefore, the optical signal-to-noise ratio (OSNR) might become lower. To counter this, the node setting unit 305 corrects the information about the opposite characteristics of the transmission band so that at least a decrease in narrowing equal to or greater than the threshold value THa can be obtained, and then notifies the corresponding one of the nodes #1 through #4 of the information.

Figure 11:
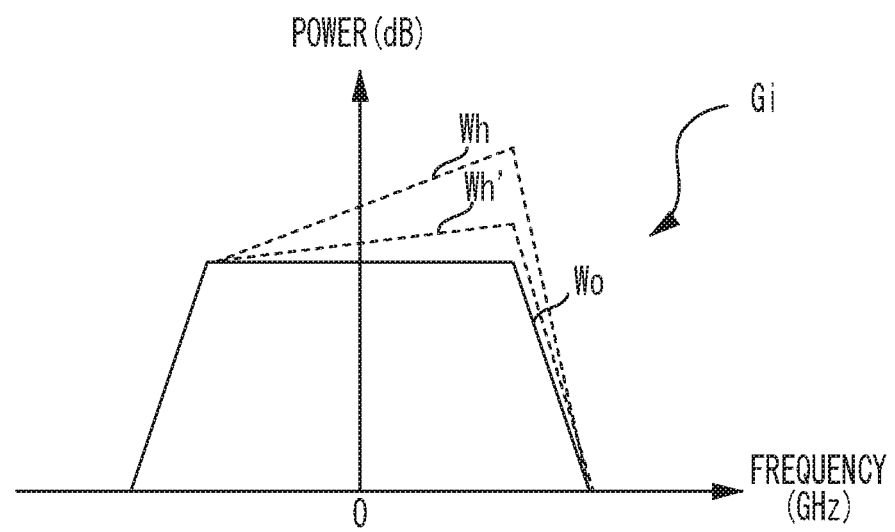
FIG. 11 is a diagram showing an example of a pre-equalization process.
Figure 11:
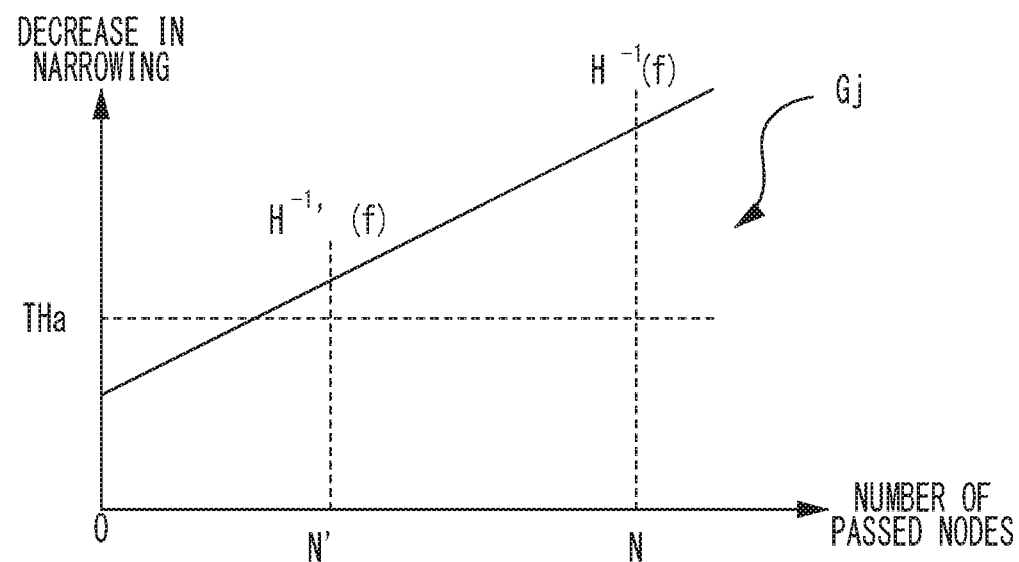

FIG. 11 is a diagram showing an example of a pre-equalization process. The graph denoted by reference sign Gi shows an example of changes caused by the pre-equalization process in the spectrum of an optical signal St. In the graph denoted by reference sign Gi, the abscissa axis indicates frequency (GHz), and the ordinate axis indicates power (dB).

Reference sign Wo indicates the spectrum in a case where any pre-equalization process is not performed. Reference sign Wh indicates the spectrum after a pre-equalization process based on uncorrected information about the opposite characteristics of the transmission path. Reference sign Wh' indicates the spectrum after a pre-equalization process based on corrected information about the opposite characteristics of the transmission path.

In a case where the compensation amount in a pre-equalization process is large as indicated by reference sign Wh, there is a possibility that the optical signal-to-noise ratio becomes lower. Therefore, the node setting unit 305 corrects the information about the opposite characteristics of the transmission path as indicated by reference signa Wh'.

The graph denoted by reference sign Gj shows an example of the theoretical relationship between the number of nodes passed by the optical signal St and the decrease in narrowing. In the graph denoted by reference sign Gj, the abscissa axis indicates the number of passed nodes, and the ordinate axis indicates the decrease in narrowing. The decrease in narrowing linearly increases with respect to the number of passed nodes. The uncorrected information about the opposite characteristics ($H^{-1}(f)$) of the transmission path corresponds to the compensation amount in a case where the number of passed nodes is N (a positive integer), and the corrected information about the opposite characteristics ($H^{-1'}(f)$) of the transmission path corresponds to the compensation amount in a case where the number of passed nodes is N' (a positive integer). Here, N' is smaller than N, and represents the smallest number of passed nodes with which a decrease in narrowing equal to or greater than the threshold value THa can be obtained.

In this manner, the network monitoring control device 91 corrects the information about the opposite characteristics of the transmission band to be used in a pre-equalization process of the transmitter 28, to reduce the decrease in the optical signal-to-noise ratio. Thus, the transmission characteristics of the optical signal St improve, and the transmission distance becomes longer.

The network monitoring control device 91 performs settings of the nodes #1 through #4 in accordance with a decrease in narrowing and a signal quality value, prior to a start of transmission of an optical signal St. The ROADM 90 monitors the decrease in narrowing the signal quality value after the start of transmission of the optical signal St, and performs settings of the transmitter 28 and the receiver 27 in accordance with the results of the monitoring, for example. More specifically, the setting processing unit 1 calculates the decrease in narrowing and the signal quality value of an optical signal St received by the receiver 27, and, in accordance with the decrease in narrowing and the signal quality value, performs settings of the receiver 27 and the transmitter 28, which has transmitted the optical signal St.

Therefore, the setting processing unit 1 performs control information communication with the setting processing units 1 of the other nodes #1 through #4. Communications among the setting processing units 1 of the respective nodes #1 through #4 may be performed via the network monitoring control device 91, but the control signal delay time is long in that case. Therefore, such communications are preferably performed without any intervention of the network monitoring control device 91 as described below.

Figure 12:
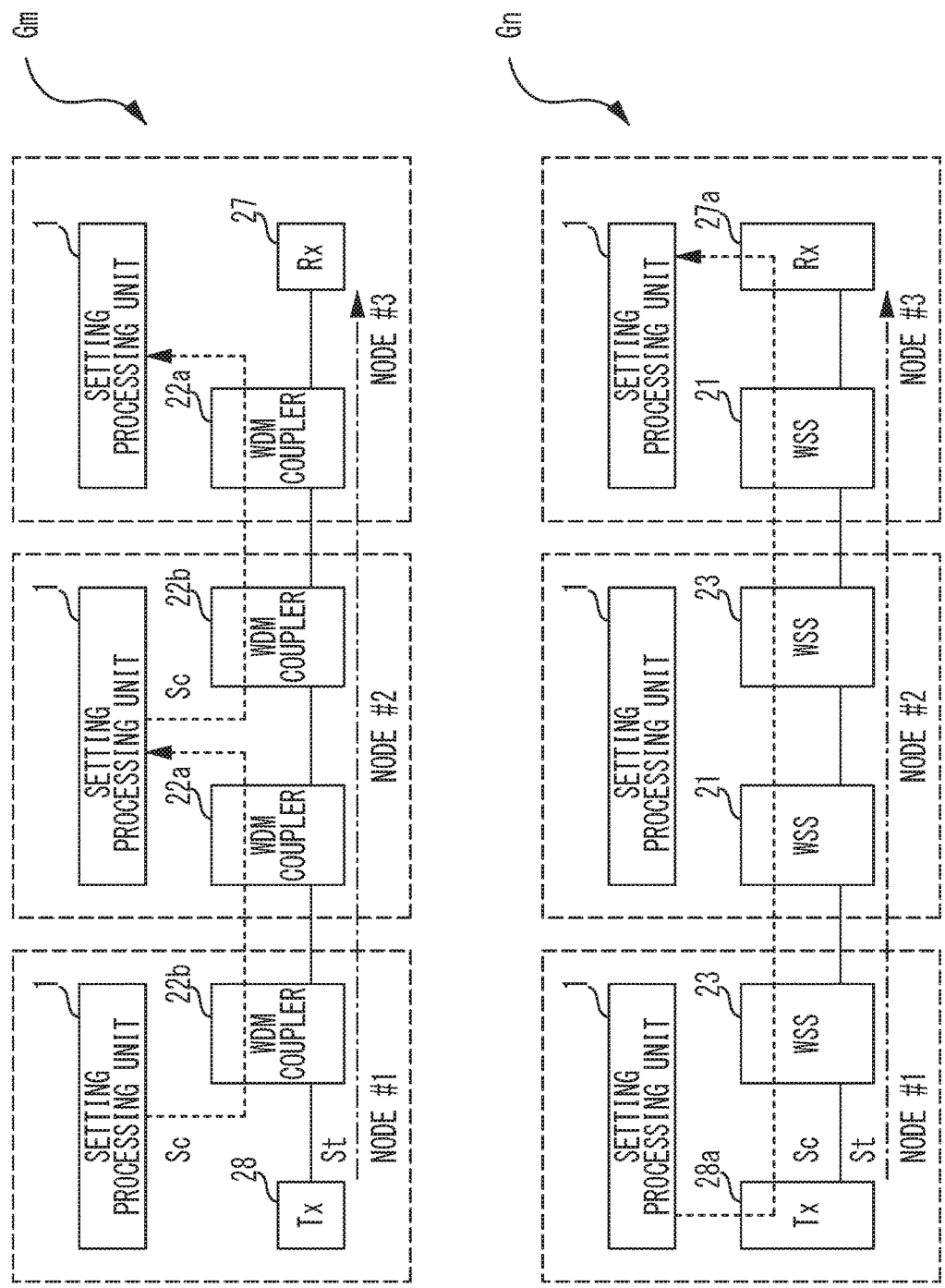
FIG. 12 is a diagram showing examples of communication paths among nodes.

FIG. 12 is a diagram showing an example of communication paths among the nodes #1 through #3. Reference sign Gm indicates the communication paths in this example (see the dotted lines). Since an optical supervisory channel is provided among the nodes #1 through #3, the setting processing unit 1 transmits a control signal that is an optical signal Sc of the optical supervisory channel, to the adjacent nodes #1 through #3.

For example, in a case where the optical signal St to be monitored is transmitted from the transmitter 28 of the node #1 to the receiver 27 of the node #3 as indicated by a dot-and-dash line, the setting processing unit 1 of the node #1 transmits the optical signal Sc to the node #2 via the WDM coupler 22*b*. In the node #2, the optical signal Sc is input to the setting processing unit 1 through the WDM coupler 22*a*.

Since the optical signal Sc is not directed to the node #2, the setting processing unit 1 of the node #2 transmits the optical signal Sc to the node #3 via the WDM coupler 22*b*. In the node #3, the optical signal Sc is input to the setting processing unit 1 through the WDM coupler 22*a*.

In this manner, the setting processing unit 1 of the node #1 on the transmission side transmits control information to the setting processing unit 1 of the node #3 on the reception side.

Reference sign Gn indicates a communication path in another example. In this example, any optical supervisory channel is not provided among the nodes #1 through #3. Therefore, a transmitter 28*a* that transmits an optical signal St assigns an optical signal Sc containing control information to an auxiliary channel. By doing so, the transmitter 28*a* superimposes, in terms of frequency, the optical signal Sc on the optical signal to be monitored, and thus, transmits the optical signal Sc to a receiver 27*a*, which is the destination of the optical signal St.

More specifically, the setting processing unit 1 of the node #1 outputs the control information to the transmitter 28*a*. The transmitter 28*a* then generates the optical signal Sc containing the control information, and superimposes the optical signal Sc on the optical signal St to be monitored. In this manner, the optical signals Sc and St are transmitted to the node #3.

In the node #3, the optical signals Sc and St are input to the receiver 27*a* via the wavelength selective switch 21. The receiver 27*a* separates the optical signals Sc and St from each other. The receiver 27*a* then extracts the control information from the optical signal Sc, and outputs the control information to the setting processing unit 1.

In this manner, the setting processing unit 1 of the node #1 on the transmission side transmits the control information to the setting processing unit 1 of the node #3 on the reception side. It should be noted that the method of this example is disclosed in Japanese Patent Application Laid-Open No. 2013-165407.

Next, the setting processing units 1 of ROADMs 90 in Examples are described.

Example 1

Figure 13:
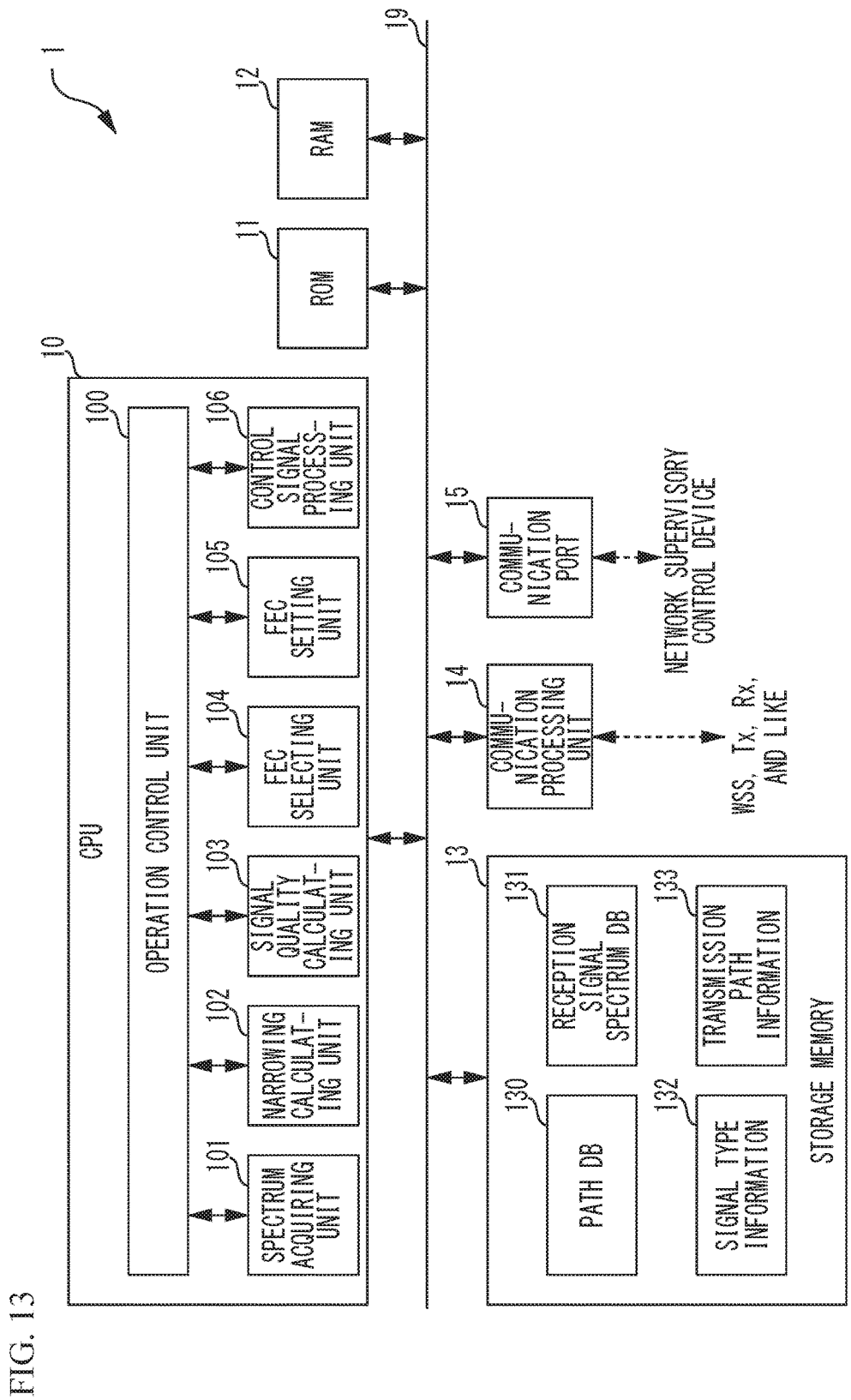
FIG. 13 is a configuration diagram showing a setting processing unit in Example 1.

FIG. 13 is a configuration diagram showing the setting processing unit 1 of Example 1. The setting processing unit 1 includes a CPU 10, a ROM 11, a RAM 12, a storage memory 13, a communication processing unit 14, and a communication port 15. The CPU 10 is connected to the ROM 11, the RAM 12, the storage memory 13, the communication processing unit 14, and the communication port 15, via a bus 19, so that signals can be input/output to one another.

The ROM 11 stores a program for driving the CPU 10. The RAM 12 functions as a working memory of the CPU 10. The communication processing unit 14 is formed with a logic circuit such as an FPGA, for example, and processes communications with the optical amplifiers 20 and 24, the wavelength selective switches 21 and 23, the transmitters 28, and the receivers 27. The communication port 15 is a LAN switch, for example, and processes communications with the network monitoring control device 91.

As the CPU 10 reads the program from the ROM 11, an operation control unit 100, a spectrum acquiring unit 101, a narrowing calculating unit 102, a signal quality calculating unit 103, an FEC selecting unit 104, an FEC setting unit 105, and a control signal processing unit 106 are formed as functions. Meanwhile, the storage memory 13 stores a path database (DB) 130, a reception signal spectrum database (DB) 131, signal type information 132, and transmission path information 133.

The operation control unit 100 controls operation of the entire ROADM 90. The operation control unit 100 receives various kinds of instructions from the network monitoring control device 91 via the communication port 15. In accordance with the instructions, the operation control unit 100 controls the optical amplifiers 20 and 24, the wavelength selective switches 21 and 23, the optical-electrical converting unit 290, the electrical-optical converting unit 291, the transmitters 28, and the receivers 27. In accordance with a predetermined sequence, the operation control unit 100 also issues operation instructions to the spectrum acquiring unit 101, the narrowing calculating unit 102, the signal quality calculating unit 103, the FEC selecting unit 104, the FEC setting unit 105, and the control signal processing unit 106.

Combinations of the transmitters 28 and the receiver 27 that transmit/receive optical signals St via optical paths are registered in the path DB 130. The operation control unit 100 selects a combination of the transmitter 28 and the receiver 27 from the path DB 130, and performs a process of monitoring the decrease in narrowing and the signal quality of the optical signal St. The operation control unit 100 instructs the spectrum acquiring unit 101 to acquire the reception spectrum information A(f) about the optical signal St.

The spectrum acquiring unit 101 is an example of an acquiring unit, and acquires the reception spectrum information A(f) about the spectrum of the optical signal St, from the optical signal St received by the receiver 27. The spectrum acquiring unit 101 stores the acquired reception spectrum information A(f) into the reception signal spectrum DB 131. It should be noted that the reception spectrum information A(f) is an example of spectrum information.

The operation control unit 100 instructs the narrowing calculating unit 102 to calculate the decrease in narrowing of the optical signal St received by the receiver 27. The narrowing calculating unit 102 calculates the decrease in narrowing by the same calculation method as that used by the influence analyzing unit 301b of the network monitoring control device 91.

That is, the narrowing calculating unit 102 calculates the sampling timing error in a case where a clock signal is extracted from the optical signal St, in accordance with the reception spectrum information A(f). By doing so, the narrowing calculating unit 102 calculates the decrease of narrowing of the optical signal St. The narrowing calculating unit 102 calculates the decrease of narrowing, using one of the above described calculation methods (1) through (3).

Thus, the narrowing calculating unit 102 can easily calculate the decrease in narrowing, without performing any complicated calculation from a large number of parameters relating to the network operation status such as the number of signals to be subjected to adding/dropping in the optical network. The narrowing calculating unit 102 outputs the decrease in narrowing to the operation control unit 100.

The operation control unit 100 also instructs the signal quality calculating unit 103 to calculate the signal quality of the optical signal St received by the receiver 27. The signal quality calculating unit 103 calculates the signal quality of the optical signal St by the same calculation method as that used by the signal quality calculating unit 302 of the network monitoring control device 91.

More specifically, the signal quality calculating unit 103 calculates a signal quality value from the signal type information 132 and the transmission path information 133. The signal type information 132 and the transmission path information 133 are the same as the signal type information 333 and the transmission path information 334 in the network monitoring control device 91. The signal quality calculating unit 103 outputs the signal quality value to the operation control unit 100.

The operation control unit 100 compares the decrease in narrowing and the signal quality value with the respective threshold values THa and THb. In a case where the decrease in narrowing and the signal quality value are smaller than the respective threshold values THa and THb, the operation control unit 100 instructs the narrowing calculating unit 102 and the signal quality calculating unit 103 to calculate decreases in narrowing and signal quality values for the respective FEC methods Xa and Xb.

To acquire the reception spectrum information A(f) for the respective FEC methods Xa and Xb, the operation control unit 100 instructs the FEC selecting unit 104 to set an FEC code type for the receiver 27, and instructs the control signal processing unit 106 to generate a control signal for setting an FEC code type for the transmitter 28. In accordance with an instruction from the operation control unit 100, the FEC setting unit 105 sets an FEC code type in the FEC processing unit 704 of the receiver 27 via the communication processing unit 14.

Meanwhile, the control signal processing unit 106 processes the control signal (control information) included in the optical signal Sc of the optical supervisory channel. The control signal is input from the optical-electrical converting unit 290 to the control signal processing unit 106 via the communication processing unit 14. The control signal processing unit 106 also outputs the control signal to the electrical-optical converting unit 291 via the communication processing unit 14.

In accordance with an instruction from the operation control unit 100, the control signal processing unit 106 generates a control signal for setting an FEC code type for the FEC generating unit 800 of the transmitter 28, and transmits the control signal to the nodes #1 through #4 of the transmission source of the optical signal St. The control signal processing unit 106 of the corresponding one of the nodes #1 through #4 acquires the FEC code type from the control signal, and notifies the operation control unit 100 of the FEC code type.

The operation control unit 100 instructs the FEC setting unit 105 to set the FEC code type for the FEC generating unit 800. In accordance with the instruction from the operation control unit 100, the FEC setting unit 105 sets the FEC code type for the FEC generating unit 800. Thus, FEC code types are set in the transmitter 28 and the receiver 27.

When the setting of FEC code types is changed, the operation control unit 100 instructs the spectrum acquiring unit 101 to acquire the reception spectrum information A(f). The narrowing calculating unit 102 calculates decreases in narrowing for the respective FEC code types, and outputs the decreases in narrowing to the operation control unit 100. The signal quality calculating unit 103 calculates signal quality values for the respective FEC code types, and outputs the signal quality values to the operation control unit 100.

The operation control unit 100 outputs the decreases in narrowing and the signal quality values for the respective FEC code types to the FEC selecting unit 104, and instructs the FEC selecting unit 104 to select an FEC code type. The FEC selecting unit 104 is an example of a selecting unit, and selects an FEC code type in accordance with a signal quality value and a decrease in narrowing, using the same method as that used by the FEC selecting unit 303 of the network monitoring control device 91. More specifically, the FEC selecting unit 104 selects the FEC method Xa or Xb with which the decrease in narrowing and the signal quality values are equal to or greater than the respective threshold values THa and THb.

The FEC selecting unit 104 notifies the operation control unit 100 of the selected FEC method Xa or Xb, or the FEC code type. The operation control unit 100 then instructs the control signal processing unit 106 and the FEC setting unit 105 to set the FEC code type in the transmitter 28 and the receiver 27 in the same manner as described above.

Figure 14:
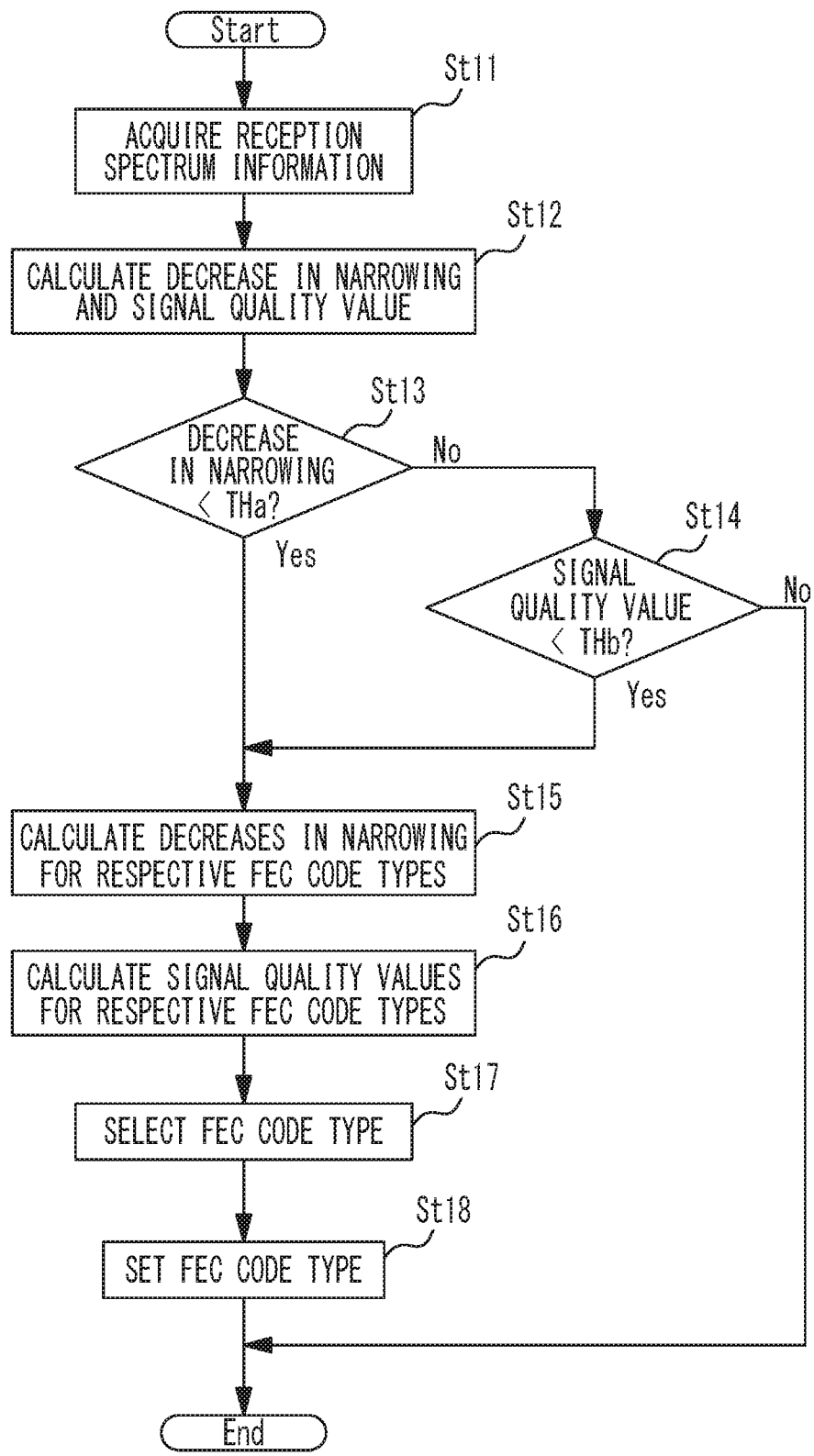
FIG. 14 is a flowchart showing operation of the setting processing unit in Example 1.

FIG. 14 is a flowchart showing operation of the setting processing unit 1 in Example 1. This operation is an example of a signal monitoring method. First, the spectrum acquiring unit 101 acquires the reception spectrum information A(f) about an optical signal St received by the receiver 27 (step St11).

The narrowing calculating unit 102 and the signal quality calculating unit 103 then calculate a decrease in narrowing and a signal quality value, respectively, from the reception spectrum information A(f) (step St12). With this, the setting processing unit 1 monitors the decrease in narrowing and the signal quality value of the optical signal St being received.

The operation control unit 100 then compares the decrease in narrowing with the threshold value THa (step St13). If the decrease in narrowing is smaller than the threshold value THa (Yes in step St13), the processes in step St15 and the later steps are performed. If the decrease in narrowing is equal to or greater than the threshold value THa (No in step St13), the operation control unit 100 compares the signal quality value with the threshold value THb (step St14).

If the signal quality value is equal to or greater than the threshold value THb (No in step St14), the process comes to an end. If the signal quality value is smaller than the threshold value THb (Yes in step St14), the processes in step St15 and the later steps are performed. In this manner, FEC code types are changed in a case where the decrease in narrowing and the signal quality value are smaller than the threshold values THa and THb, respectively.

The narrowing calculating unit 102 calculates decreases in narrowing for respective FEC code types (step St15). The signal quality calculating unit 103 then calculates signal quality values for the respective FEC code types (step St16). It should be noted that the process in step St16 may be performed before the process in step St15.

The FEC selecting unit 104 then selects an FEC code type in accordance with the decrease in narrowing and the signal quality value (step St17). The control signal processing unit 106 and the FEC setting unit 105 then set the selected FEC code type in the transmitter 28 and the receiver 27 (step St18). The setting processing unit 1 operates in this manner.

As described above, the FEC setting unit 105 selects an FEC code type in accordance with a decrease in narrowing and a signal quality value. Accordingly, an appropriate FEC code corresponding to the decrease in narrowing and the signal quality value can be used. Thus, the transmission characteristics of an optical signal St improve, and the transmission distance becomes longer. Alternatively, the FEC setting unit 105 may select an FEC code in accordance only with a decrease in narrowing. In such a case, an appropriate FEC code corresponding to the decrease in narrowing can be used.

Example 2

Figure 15:
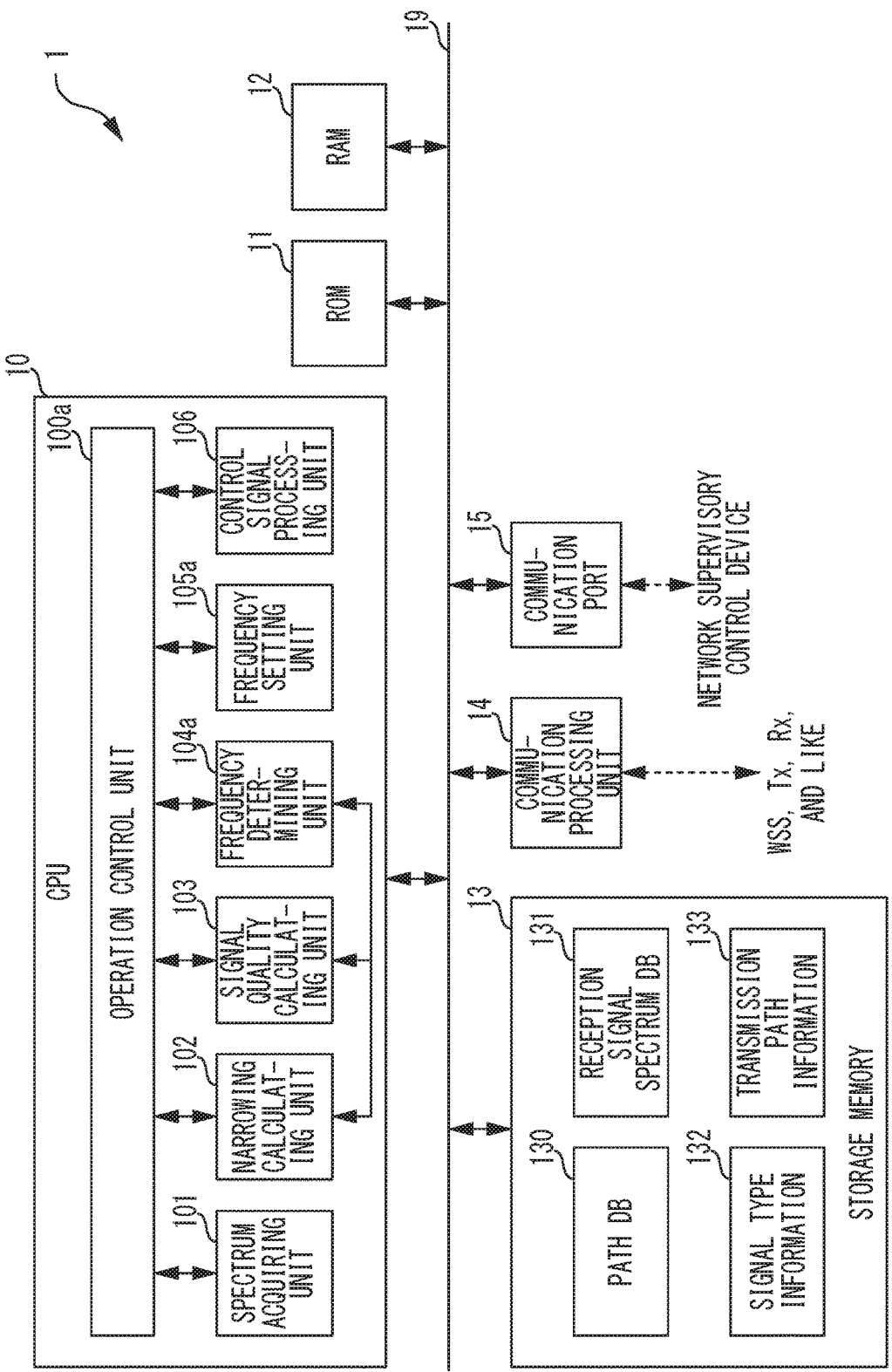
FIG. 15 is a configuration diagram showing a setting processing unit in Example 2.

FIG. 15 is a configuration diagram showing the setting processing unit 1 of Example 2. In FIG. 15, the same components as those shown in FIG. 13 are denoted by the same reference numerals as those used in FIG. 13, and explanation thereof is not made herein.

As the CPU 10 reads a program from the ROM 11, an operation control unit 100a, the spectrum acquiring unit 101, the narrowing calculating unit 102, the signal quality calculating unit 103, a frequency determining unit 104a, a frequency setting unit 105a, and the control signal processing unit 106 are formed as functions. Meanwhile, the storage memory 13 stores the path DB 130, the reception signal spectrum DB 131, the signal type information 132, and transmission path information 133.

The operation control unit 100a controls operation of the entire ROADM 90. The operation control unit 100a receives various kinds of instructions from the network monitoring control device 91 via the communication port 15. In accordance with the instructions, the operation control unit 100a controls the optical amplifiers 20 and 24, the wavelength selective switches 21 and 23, the transmitters 28, and the receivers 27. In accordance with a predetermined sequence, the operation control unit 100a also issues operation instructions to the spectrum acquiring unit 101, the narrowing calculating unit 102, the signal quality calculating unit 103, the frequency determining unit 104a, the frequency setting unit 105a, and the control signal processing unit 106.

The operation control unit 100a monitors the decrease in narrowing and the signal quality value of an optical St as in Example 1. In a case where the decrease in narrowing and the signal quality value are smaller than the respective threshold values THa and THb, the operation control unit 100a changes the center frequency of the optical signal St within a predetermined range, and sets the center frequency at such a value that the decrease in narrowing and the signal quality value become equal to or greater than the respective threshold values THa and THb.

More specifically, in a case where the decrease in narrowing and the signal quality value are smaller than the respective threshold values THa and THb, the operation control unit 100a instructs the frequency setting unit 105a to change the center frequency of the optical signal St. In accordance with the instruction from the operation control unit 100a, the frequency setting unit 105a changes the center frequency of local light LOr and the center frequency of the corresponding channel of the wavelength selective switch 21.

The operation control unit 100a further instructs the control signal processing unit 106 to generate a control signal (control information) for changing the center frequency of the optical signal St. In accordance with the instruction from the operation control unit 100a, the control signal processing unit 106 generates a control signal for changing the center frequency of the optical signal St, and transmits the control signal to the nodes #1 through #4 of the transmission source of the optical signal St. The control signal processing unit 106 of the corresponding one of the nodes #1 through #4 acquires the amount of change in frequency from the control signal, and notifies the operation control unit 100a of the amount of change in frequency.

In accordance with the notification, the operation control unit 100a instructs the frequency setting unit 105a to change the center frequency. In accordance with the instruction from the operation control unit 100a, the frequency setting unit 105a changes the center frequency of transmission light LOs and the center frequency of the corresponding channel of the wavelength selective switch 23.

The control signal processing unit 106 also transmits the control signal to relay nodes #1 through #4 between the nodes #1 through #4 on the transmission side and the nodes #1 through #4 on the reception side. In the relay nodes #1 through #4, the frequency setting unit 105a changes the center frequencies of the corresponding channels of the wavelength selective switches 21 and 23, in accordance with the control signal. As a result, the center frequency of the optical signal St changes.

The narrowing calculating unit 102 calculates the change in the decrease in narrowing with respect to the center frequency of the optical signal St, and the signal quality calculating unit 103 calculates the change in the signal quality of the optical signal St with respect to the center frequency of the optical signal St. The operation control unit 100a instructs the frequency determining unit 104a to determine the center frequency of the optical signal St.

In accordance with the instruction from the operation control unit 100a, the frequency determining unit 104a acquires the data of the characteristics of the changes in the decrease in narrowing and the signal quality from the narrowing calculating unit 102 and the signal quality calculating unit 103, and determines the center frequency from the change characteristics data by the same method as that used by the frequency determining unit 304 of the network monitoring control device 91. The frequency determining unit 304 determines the center frequency so that the differences from the maximum values for the decrease in narrowing and the signal quality value become equal to or smaller than predetermined values, or the decrease in narrowing and the signal quality value approach the maximum values, in the characteristics shown in FIG. 9. As a result, the decrease in narrowing and the signal quality value become equal to or greater than the respective threshold values THa and THb.

In this manner, the frequency determining unit 104a determines the center frequency of the optical signal St, in accordance with the changes in the decrease in narrowing and the signal quality with respect to the center frequency of the optical signal St. The frequency determining unit 104a then notifies the operation control unit 100a of the determined center frequency. It should be noted that the frequency determining unit 104a is an example of a determining unit.

The operation control unit 100a instructs the frequency setting unit 105a and the control signal processing unit 106 to set the reported center frequency. The frequency setting unit 105a sets the center frequency in the receiver 27 and the wavelength selective switch 21. The control signal processing unit 106 also transmits the control signal to the nodes #1 through #4 on the side of transmission of the optical signal St. The control signal processing unit 106 further transmits the control signal to the relay nodes #1 through #4 for the optical signal St, so that the center frequency is set in the wavelength selective switches 21 and 23. Thus, the center frequency of the optical signal St is set in accordance with the determination made by the frequency determining unit 104a.

Figure 16:
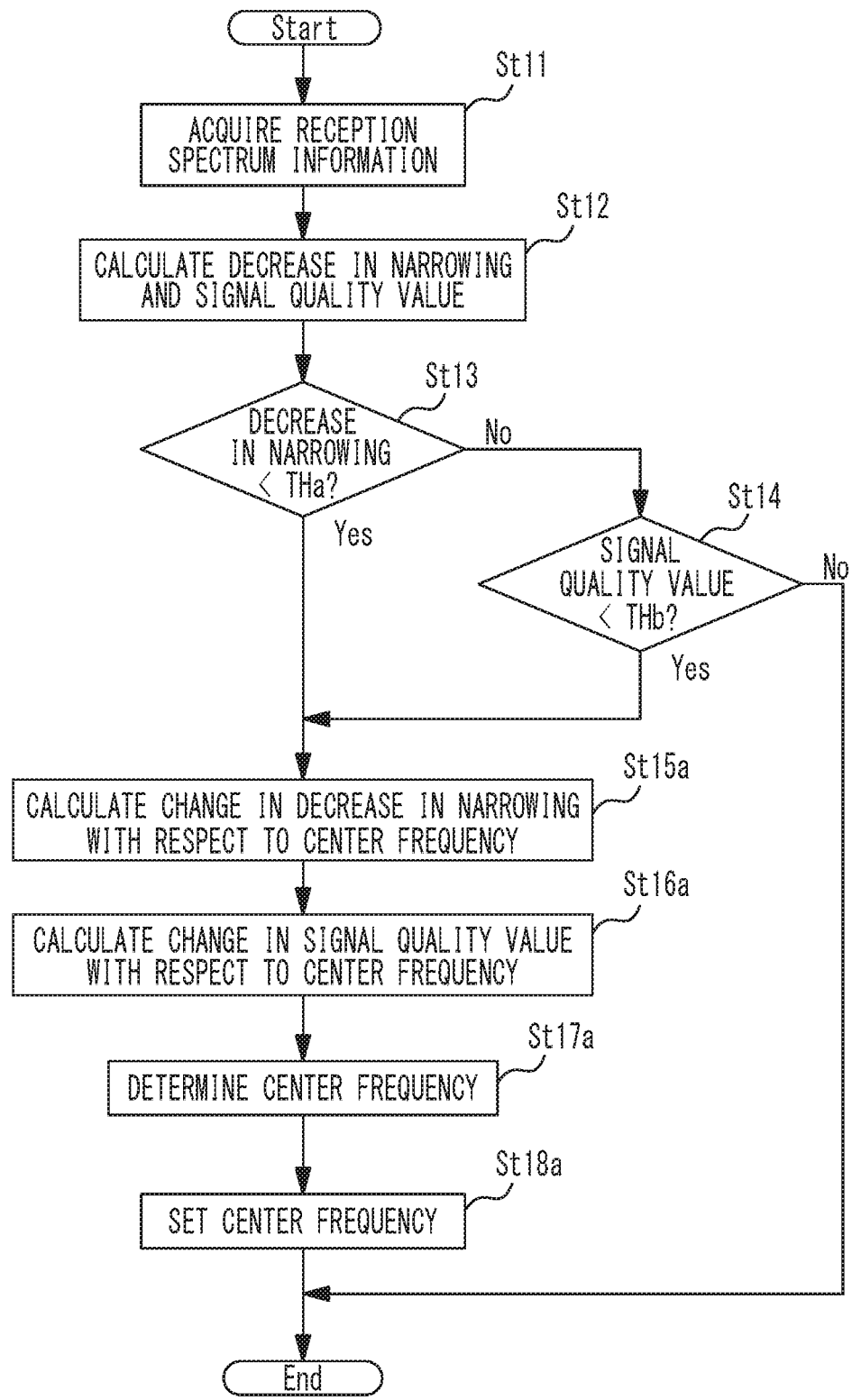
FIG. 16 is a flowchart showing operation of the setting processing unit in Example 2.

FIG. 16 is a flowchart showing operation of the setting processing unit 1 in Example 2. In FIG. 16, the same processes as those shown in FIG. 14 are denoted by the same reference numerals as those used in FIG. 14, and explanation thereof is not made herein.

If the decrease in narrowing is smaller than the threshold value THa (Yes in step S13), or if the signal quality value is smaller than the threshold value THb (Yes in step St14), the processes in step St15a and the later steps are performed.

The narrowing calculating unit 102 calculates the change in the decrease in narrowing with respect to the center frequency of the optical signal St (step St15a). The signal quality calculating unit 103 then calculates the change in the signal quality value with respect to the center frequency of the optical signal St (step St16a). It should be noted that the process in step St16a may be performed before the process in step St15a.

In accordance with the changes in the decrease in narrowing and the signal quality with respect to the center frequency of the optical signal St, the frequency determining unit 104a then determines the center frequency of the optical signal St (step St17a). The frequency setting unit 105a and the control signal processing unit 106 then set the center frequency (step St18a). The setting processing unit 1 operates in this manner.

As described above, the frequency determining unit 104a determines the center frequency of an optical signal St, in accordance with the changes in the decrease in narrowing and the signal quality value with respect to the center frequency of the optical signal St. Accordingly, an appropriate center frequency can be set in accordance with the changes in the decrease in narrowing and the signal quality value. Thus, the transmission characteristics of the optical signal St improve, and the transmission distance becomes longer. Alternatively, the frequency determining unit 104a may determine the center frequency in accordance only with the change in the decrease in narrowing with respect to the center frequency. In such a case, an appropriate center frequency can be set in accordance with the decrease in narrowing.

Example 3

Figure 17:
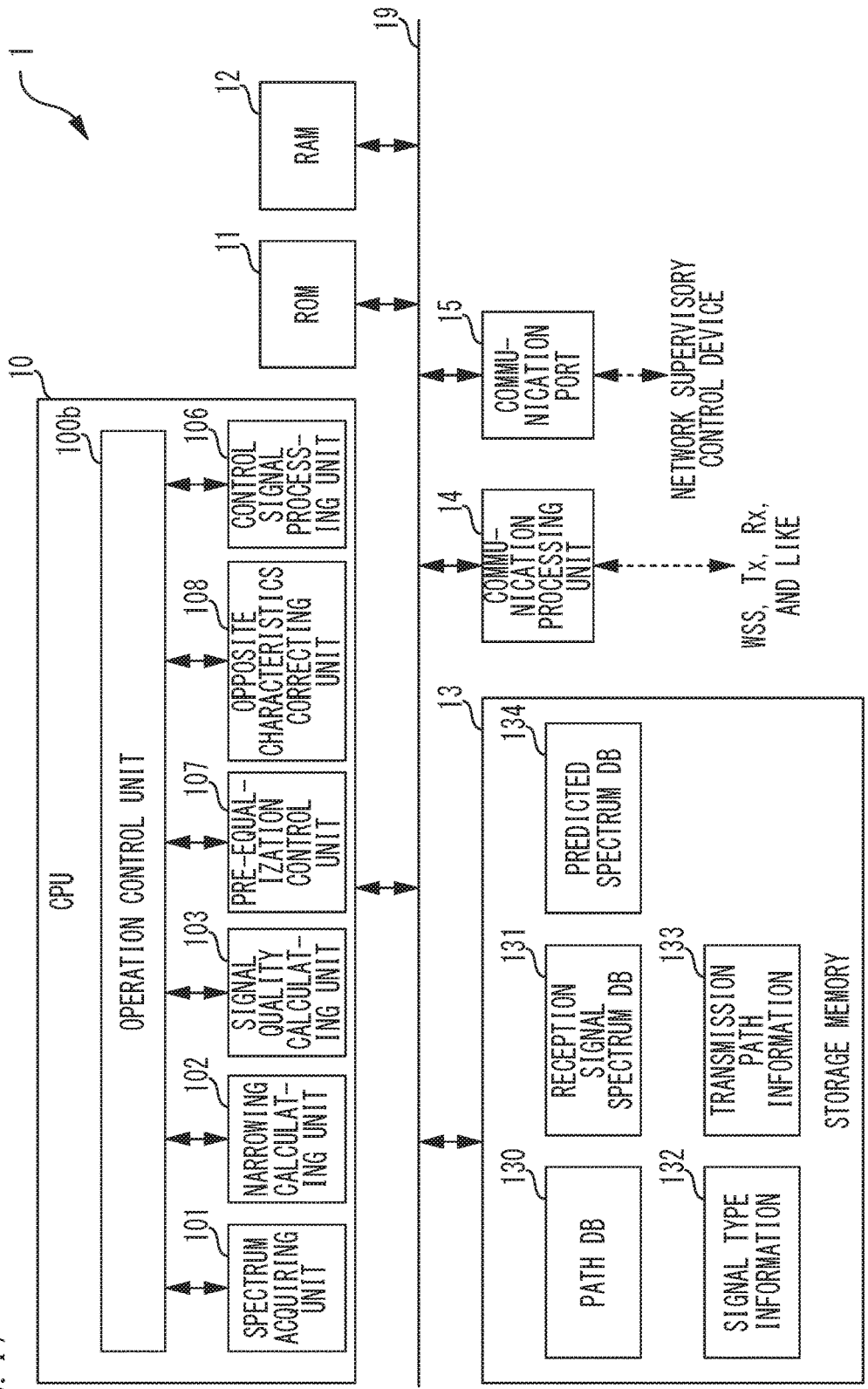
FIG. 17 is a configuration diagram showing a setting processing unit in Example 3.

FIG. 17 is a configuration diagram showing the setting processing unit 1 of Example 3. In FIG. 17, the same components as those shown in FIG. 13 are denoted by the same reference numerals as those used in FIG. 13, and explanation thereof is not made herein.

As the CPU 10 reads a program from the ROM 11, an operation control unit 100b, the spectrum acquiring unit 101, the narrowing calculating unit 102, the signal quality calculating unit 103, a pre-equalization control unit 107, an opposite characteristics correcting unit 108, and the control signal processing unit 106 are formed as functions. Meanwhile, the storage memory 13 stores the path DB 130, the reception signal spectrum DB 131, the signal type information 132, transmission path information 133, and a predicted spectrum database (DB) 134.

The operation control unit 100b controls operation of the entire ROADM 90. The operation control unit 100b receives various kinds of instructions from the network monitoring control device 91 via the communication port 15. In accordance with the instructions, the operation control unit 100b controls the optical amplifiers 20 and 24, the wavelength selective switches 21 and 23, the transmitters 28, and the receivers 27. In accordance with a predetermined sequence, the operation control unit 100b also issues operation instructions to the spectrum acquiring unit 101, the narrowing calculating unit 102, the signal quality calculating unit 103, the pre-equalization control unit 107, the opposite characteristics correcting unit 108, and the control signal processing unit 106.

The operation control unit 100b monitors the decrease in narrowing and the signal quality value of an optical St as in Example 1. In a case where the decrease in narrowing and the signal quality value are smaller than the respective threshold values THa and THb, the operation control unit 100b outputs a warning to the network monitoring control device 91, and controls pre-equalization in the nodes #1 through #4 on the transmission side. The receivers 27 are to receive a pre-equalized optical signal St. Accordingly, the operation control unit 100b can improve the transmission characteristics of the optical signal St by controlling the pre-equalization in the nodes #1 through #4 on the transmission side.

More specifically, in a case where the decrease in narrowing and the signal quality value are smaller than the respective threshold values THa and THb, the operation control unit 100b outputs a warning to the network monitoring control device 91 via the communication port 15. The operation control unit 100b further instructs the pre-equalization control unit 107 to control the pre-equalization.

The pre-equalization control unit 107 is an example of a control unit, and controls pre-equalization of an optical signal St in the transmitters 28 of the nodes #1 through #4 on the transmission side. It should be noted that each transmitter 28 is an example of the device as the transmission source of the optical signal St.

The pre-equalization control unit 107 acquires the reception spectrum information A(f) from the reception signal spectrum DB 131, and acquires predicted spectrum information A'(f) from the predicted spectrum DB 134. The predicted spectrum information A'(f) is information about the spectrum of the optical signal St predicted in accordance with the design. The pre-equalization control unit 107 calculates the difference between the reception spectrum information A(f) and the predicted spectrum information A'(f).

$$\Delta A = A'(f)/A(f) \quad (6)$$

The pre-equalization control unit 107 calculates the difference ΔA between the reception spectrum information A(f) and the predicted spectrum information A'(f) according to the above expression (6). The pre-equalization control unit 107 outputs the difference ΔA to the operation control unit 100b.

The operation control unit 100b instructs the control signal processing unit 106 to notify the nodes #1 through #4 on the transmission side of the difference ΔA. In accordance with the instruction from the operation control unit 100b, the control signal processing unit 106 generates a control signal containing the difference ΔA, and transmits the control signal to the nodes #1 through #4 on the transmission side.

In the nodes #1 through #4 on the transmission side, the control signal processing unit 106 receives the control signal containing the difference ΔA. The control signal processing unit 106 outputs the difference ΔA to the operation control unit 100b. The operation control unit 100b instructs the opposite characteristics correcting unit 108 to perform a correction process based on the difference ΔA.

In accordance with the instruction from the operation control unit 100b, the opposite characteristics correcting unit 108 corrects the opposite characteristics ($H^{-1}$'(f)) of the transmission band to be used by the pre-equalization processing unit 802. Thus, the pre-equalization of the optical signal St is optimized.

Figure 18:
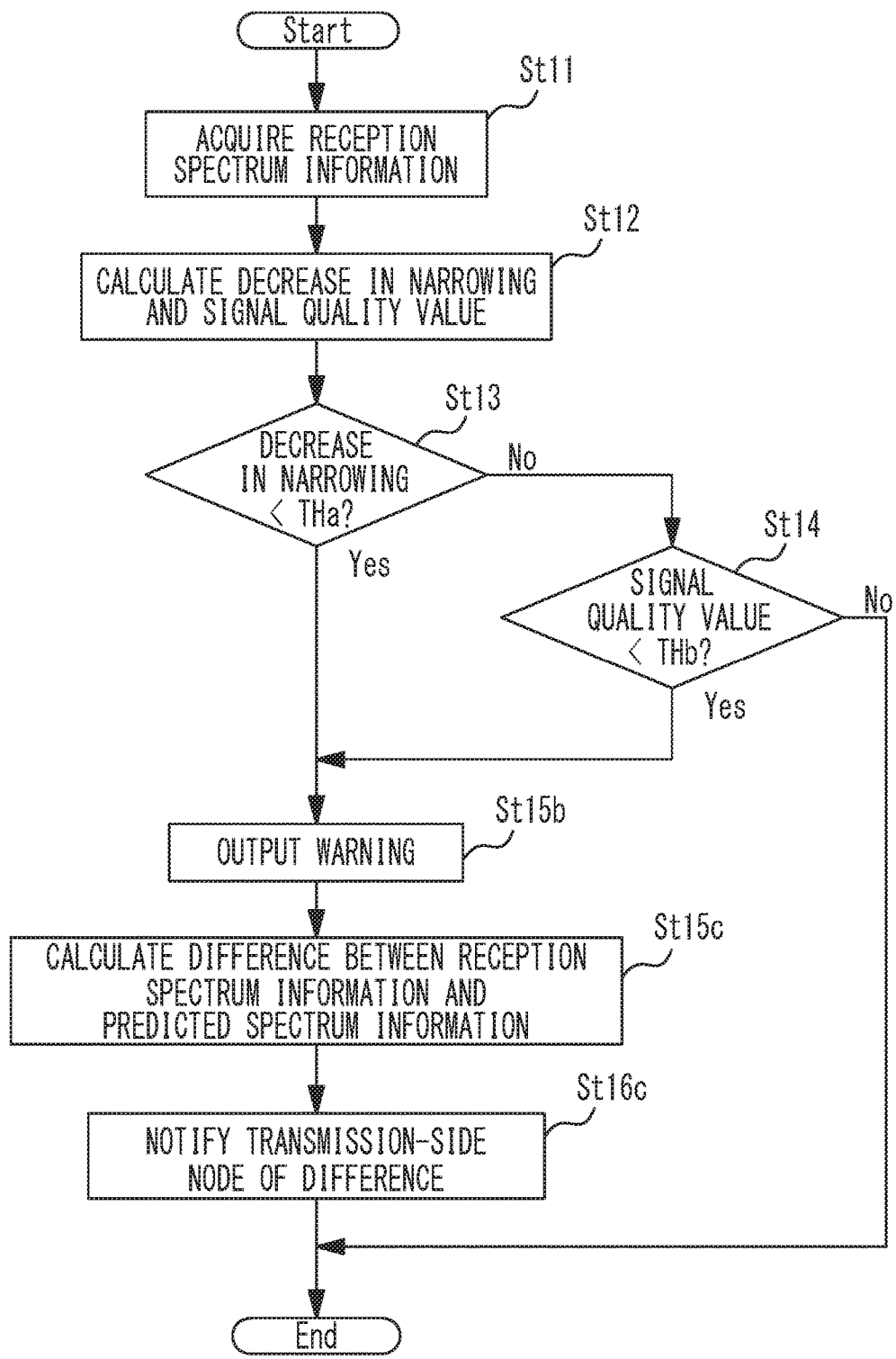
FIG. 18 is a flowchart showing operation of the setting processing unit in Example 3.

FIG. 18 is a flowchart showing operation of the setting processing unit 1 in Example 3. In FIG. 18, the same processes as those shown in FIG. 14 are denoted by the same reference numerals as those used in FIG. 14, and explanation thereof is not made herein.

If the decrease in narrowing is smaller than the threshold value THa (Yes in step St13), or if the signal quality value is smaller than the threshold value THb (Yes in step St14), the processes in step St15a and the later steps are performed.

The operation control unit 100b outputs a warning to the network monitoring control device 91 (step St15b). Upon receipt of the warning, the network monitoring control device 91 displays the warning on the output device 36, for example.

The pre-equalization control unit 107 then calculates the difference ΔA between the reception spectrum information A(f) and the predicted spectrum information A'(f) (step St15c). The control signal processing unit 106 then notifies the nodes #1 through #4 on the transmission side of the difference ΔA (step St16c). Thus, the pre-equalization control unit 107 controls the pre-equalization of the optical signal St in the nodes #1 through #4 on the transmission side. The setting processing unit 1 operates in this manner.

As described above, the pre-equalization control unit 107 controls the pre-equalization of an optical signal St, in accordance with signal quality and a decrease in narrowing. Accordingly, even in a case where the signal quality value and the decrease in narrowing are small, the transmission characteristics of the optical signal St improve, and the transmission distance becomes longer. Alternatively, the pre-equalization control unit 107 may control the pre-equalization of an optical signal St in accordance only with the decrease in narrowing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A transmission device comprising:
a receiving unit that receives an optical signal;
an acquiring unit that acquires spectrum information from the optical signal, the spectrum information relating to a spectrum of the optical signal; and
a narrowing calculating unit that calculates an index value for narrowing of a band of the optical signal by calculating a sampling timing error in accordance with the spectrum information, the sampling timing error being an error when a clock signal is extracted from the optical signal.

2. The transmission device according to claim 1, wherein
the narrowing calculating unit calculates the index value for the narrowing for each type of an error correction code included in the optical signal, and
the transmission device further comprises
a selecting unit that selects a type of the error correction code in accordance with the index value for the narrowing.

3. The transmission device according to claim 2, further comprising
a signal quality calculating unit that calculates signal quality of the optical signal for each type of the error correction code,
wherein the selecting unit selects a type of the error correction code in accordance with the signal quality and the index value for the narrowing.

4. The transmission device according to claim 1, wherein
the narrowing calculating unit calculates a change in the index value for the narrowing with respect to a center frequency of the optical signal, and
the transmission device further comprises
a determining unit that determines the center frequency of the optical signal in accordance with the change in the index value for the narrowing.

5. The transmission device according to claim 4, further comprising
a signal quality calculating unit that calculates a change in signal quality of the optical signal with respect to the center frequency of the optical signal,
wherein the determining unit determines the center frequency of the optical signal in accordance with the change in the signal quality and the change in the index value for the narrowing.

6. The transmission device according to claim 1, wherein
the receiving unit receives the optical signal subjected to pre-equalization, and
the transmission device further comprises
a control unit that controls pre-equalization of the optical signal in a device in accordance with the index value for the narrowing, the device being a transmission source of the optical signal.

7. The transmission device according to claim 6, further comprising
a signal quality calculating unit that calculates signal quality of the optical signal,
wherein the control unit controls the pre-equalization of the optical signal in accordance with the signal quality and the index value for the narrowing.

8. A signal monitoring method comprising:
receiving an optical signal;
acquiring spectrum information from the optical signal, the spectrum information relating to a spectrum of the optical signal; and
calculating an index value for narrowing of a band of the optical signal by calculating a sampling timing error in accordance with the spectrum information, the sampling timing error being an error when a clock signal is extracted from the optical signal.

9. The signal monitoring method according to claim 8, wherein
the index value for the narrowing is calculated for each type of an error correction code included in the optical signal, and
the signal monitoring method further comprises
selecting a type of the error correction code in accordance with the index value for the narrowing.

10. The signal monitoring method according to claim 9, further comprising
calculating signal quality of the optical signal for each type of the error correction code,
wherein a type of the error correction code is selected in accordance with the signal quality and the index value for the narrowing.

11. The signal monitoring method according to claim 8, wherein
a change in the index value for the narrowing with respect to a center frequency of the optical signal is calculated, and
the signal monitoring method further comprises
determining the center frequency of the optical signal in accordance with the change in the index value for the narrowing.

12. The signal monitoring method according to claim 11, further comprising
calculating a change in signal quality of the optical signal with respect to the center frequency of the optical signal,
wherein the center frequency of the optical signal is determined in accordance with the change in the signal quality and the change in the index value for the narrowing.

13. The signal monitoring method according to claim 8, wherein
the optical signal subjected to pre-equalization is received, and
the signal monitoring method further comprises
controlling pre-equalization of the optical signal in a device in accordance with the index value for the narrowing, the device being a transmission source of the optical signal.

14. The signal monitoring method according to claim 13, further comprising
calculating signal quality of the optical signal,
wherein the pre-equalization of the optical signal is controlled in accordance with the signal quality and the index value for the narrowing.

* * * * *